(12) United States Patent
Numai

(10) Patent No.: US 6,351,311 B1
(45) Date of Patent: Feb. 26, 2002

(54) RING LASER GYRO WITH AN INJECTED THIRD BEAM

(75) Inventor: Takahiro Numai, Ninomiya-machi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/499,679

(22) Filed: Feb. 8, 2000

(30) Foreign Application Priority Data

| Feb. 10, 1999 | (JP) | 11-033275 |
| Feb. 10, 1999 | (JP) | 11-033276 |
| Feb. 2, 2000 | (JP) | 2000-025574 |

(51) Int. Cl.$^7$ .............................................. G01C 19/68
(52) U.S. Cl. ..................................... 356/472; 356/461
(58) Field of Search .................. 356/459, 461, 356/472; 372/94

(56) References Cited

U.S. PATENT DOCUMENTS 3,323,411 A * 6/1967 Killpatrick .................. 356/472
3,697,181 A * 10/1972 Macek et al. ................ 356/472
4,431,308 A    2/1984 Mitsuhashi et al.
4,807,998 A * 2/1989 Weber ......................... 356/472

FOREIGN PATENT DOCUMENTS

| JP | 57-43486 | 3/1982 |
| JP | 4-174317 | 6/1992 |
| JP | 5-288556 | 11/1993 |

* cited by examiner

Primary Examiner—Samuel A. Turner
(74) Attorney, Agent, or Firm—Fitzpatrick, Cella, Harper & Scinto

(57) ABSTRACT

A gyro includes a laser device for generating a first and second laser beams to be propagated circuitally in opposition directions. An electric signal is taken out from the laser device. A third laser beam having an oscillation frequency different from that of the first laser beam is led to enter the laser device so as to be propagated circuitally in the same direction as the first laser beam.

26 Claims, 14 Drawing Sheets

RING LASER GYRO WITH AN INJECTED THIRD BEAM

BACKGROUND OF THE INVENTION

1. Field of the Invention

This invention relates to a laser device. More particularly, it relates to a gyro that uses laser beams.

2. Related Background Art

Known gyros for detecting the angular velocity of a moving object include mechanical gyros comprising a rotor or an oscillator as well as optical gyros. Particularly, optical gyros are bringing forth technological innovations in the field of gyro technologies due to their remarkable advantages including that they can start to operate instantaneously and show a broad dynamic range. Various optical gyros are known to date including ring laser type gyros, optical fiber gyros and passive type ring oscillator gyros. Of these, the ring laser type gyro that utilizes a gas laser is the earliest comer and gyros of this type are popularly used in aeroplanes at present. In recent years, small and highly sophisticated ring laser type gyros that are formed on a semiconductor substrate have been proposed. See, inter alia, Japanese Patent Application Laid-Open No. 5-288556.

According to the above patent publication, a ring-shaped gain waveguide 1100 is formed on a semiconductor substrate 1000 having an pn-junction and carriers are injected into the gain waveguide 1100 from an electrode 2200 as shown in FIG. 29 of the accompanying drawings in order to generate a laser oscillation. Then, the laser beams that are propagating through the gain waveguide 1100 clockwise and counterclockwise are partly taken out to interfere with each other in a photo-absorption region 1700. Then, the intensity of the interfered beams is taken out through another electrode 2300 as a photoelectric current. In FIG. 29, reference numerals 1500 and 1501 denote the laser beams propagating clockwise and counterclockwise respectively and reference numeral 1505 denotes a mirror.

Japanese Patent Application Laid-Open No. 57-43486 (U.S. Pat. No. 4,431,308) describes a gyro that utilizes the change in the terminal voltage of the element produced by the rotation thereof without taking out the beams to the outside of the semiconductor laser element. Referring to FIG. 30 of the accompanying drawings, a semiconductor laser element 5792 has upper and lower electrodes (5790, 5791). In FIG. 30, reference numeral 5793 denotes a DC blocking capacitor and reference numeral 5794 denotes an output terminal, while reference numeral 5795 denotes a resistor. As seen from FIG. 30, the semiconductor laser element of the ring laser device is connected to a drive power source 5796 and the frequency difference (beat frequency) between the frequency of the beam propagating clockwise and that of the beam propagating counterclockwise that is produced when the device shows a certain angular velocity is detected as a change in the terminal voltage of the laser element.

Japanese Patent Application Laid-Open No. 4-174317 also describes a technology of detecting the change in the terminal voltage of a laser element caused by the rotation thereof.

However, any of the known technologies as described in the above patent documents cannot detect the sense of rotation of an object. This is because a common beat frequency is detected regardless of the sense of rotation so long as the object is rotating at the same angular velocity.

Thus, with known ring laser type gyros the sense of rotation of each of the beams has to be determined by applying a dither (micro-oscillation) and determining the correlation of the dither and the obtained signal.

Additionally, there are always a laser beam propagating clockwise (CW beam) and a laser beam propagating counterclockwise (CCW beam) in known ring laser type gyros. The oscillation frequencies of the two beams remain equal to each other as long as the gyro is held stationary but they come to show a difference once the gyro is driven to rotate. The difference of the oscillation frequencies of the two beams is small when the angular velocity of the gyro is low and then there arises a lock-in phenomenon where the oscillation frequencies are pulled and locked to either of the oscillation modes due to the nonlinearity of the medium. This lock-in phenomenon observable in known ring laser type gyros can be avoided by applying a dither in a predetermined direction in advance and thereby increasing the difference in the oscillation frequencies of the CW beam and the CCW beam.

SUMMARY OF THE INVENTION

Thus, it is an object of the present invention to provide a laser device that can detect the sense of rotation.

Another object of the present invention is to provide a gyro that can detect the sense of rotation.

According to the invention, the above object is achieved by providing a gyro comprising:

a laser device for generating a first and second laser beams to be propagated circuitally in opposite directions wherein an electric signal is taken out from said laser device, wherein a third laser beam having an oscillation frequency different from that of the first laser beam is led to enter the laser device so as to be propagated circuitally in the same direction as the first laser beam.

Preferably, said third laser beam is made to enter the laser device from a corner mirror of a ring laser comprising said laser device or by way of an optical waveguide to be used for injection locking.

Preferably, said optical waveguide for injection locking is arranged in the proximity of said laser device so as to be optically coupled to the device.

Preferably, said optical waveguide for injection locking and said laser device are arranged within the penetrating depth of said third laser beam.

Preferably, said optical waveguide for injection locking is connected to the waveguide of the ring laser comprising said laser device.

Preferably, at least one of the end facets of said optical waveguide for injection locking is inclined against a plane perpendicular to the direction of propagation of said third laser beam propagating through said optical waveguide for injection locking.

According to the invention, there is also provided a gyro comprising:

a laser device for generating a first and second laser beams propagating circuitally in opposite directions; and a photodetector for detecting the interfered beam caused by the interference of the first and second laser beams emitted from the laser device;

wherein a third laser beam having an oscillation frequency different from that of the first laser beam is led to enter the laser device so as to be propagated circuitally in the same direction as the first laser beam.

DETAILED DESCRIPTION OF THE PREFERRED EMBODIMENTS

Before describing preferred modes of carrying out the invention, the principle underlying the operation of a gyro according to the invention will be described mainly by using equations.

Figure 18:
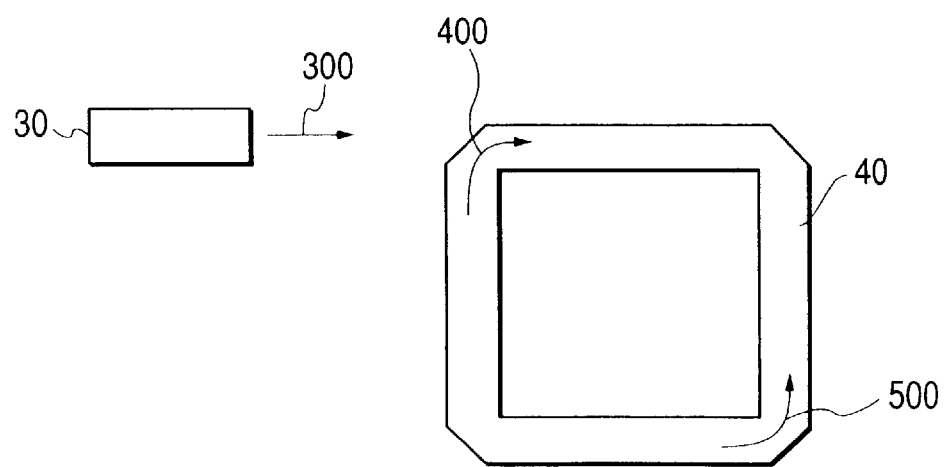
FIG. 18 is a schematic illustration of a gyro according to the invention.

Assume that a laser device having a ring laser 40 as shown in FIG. 18 generates a pair of laser beams including a laser beam 400 to be propagated clockwise (first laser beam or CW beam) with a wavelength of $\lambda_1$ and another laser beam 500 to be propagated counterclockwise (second laser beam or CCW beam) with a wavelength of $\lambda_2$ ($<\lambda_1$).

Then, still another laser beam 300 (third laser beam) (wavelength $\lambda_0$ ($>\lambda_2$)) is made to enter the ring laser 40. If the principal direction of propagation of the third laser beam 300 is the same as that of the first laser beam and the oscillation wavelengths of the two laser beams have a small difference, Equation (1) below holds true due to injection locking. In equation (1), $\lambda'_1$ represents the wavelength of the CW beam 400 when conducting injection locking.

$$\lambda'_1 = \lambda_0 \qquad (1)$$

Since the principal direction of propagation of the second laser beam is opposite to that of the third laser beam 300, the second laser beam is not subjected to injection locking.

Now, assume that the oscillation source 30 of the third laser beam 300 and the ring laser are turned clockwise at the same time.

Since the first laser beam 400 is propagating clockwise and subjected to injection locking, its oscillation frequency $f_1$ remains equal to its oscillation frequency $f_{10}$ when the ring laser is not rotated. On the other hand, since the second laser beam 500 is propagating counterclockwise and not subjected to injection locking, its oscillation frequency $f_2$ is raised from its oscillation frequency $f_{20}$ when the ring laser is not rotated by the value expressed by equation (2) below:

$$\Delta f_2 = (2S_2/\lambda_2 L_2) \cdot \Omega \qquad (2)$$

where $S_2$ is the closed area surrounded by the optical path of the second laser beam and $L_2$ is the length of the optical path of the second laser beam.

As a result, there arises a beat beam having a frequency equal to the difference of the oscillation frequency of the first laser beam 400 and that of the second laser beam 500, which is given by equation (3) below;

$$f_2 - f_1 = f_{20} - f_{10} + (\Delta f_2 + \Delta f_1) = f_{20} - f_{10} + (2S_2/\lambda_2 L_2) \cdot \Omega \qquad (3)$$

If, on the other hand, the ring laser is driven to rotate counterclockwise, there arises a beat beam having a frequency equal to the value expressed by equation (4) below;

$$f_2 - f_1 = f_{20} - f_{10} + (\Delta f_2 + \Delta f_1) = f_{20} - f_{10} + (2S_2/\lambda_2 L_2) \cdot \Omega \qquad (4)$$

Meanwhile, when there exist two or more different oscillation modes in a laser, the population inversion varies with time in response to the difference in the oscillation frequencies of the selected mode. This phenomenon is referred to as population pulsation. In the case of a laser where an electric current is led to flow such as a gas laser or a semiconductor laser, the population inversion shows a one-to-one correspondence with the impedance of the laser. When two laser beams interfere with each other within such a laser, the population inversion varies by the interference to consequently change the impedance between the electrodes of the laser. The change can be observed as a change in the terminal current when a constant voltage source is used as a drive power surface. On the other hand, the change can also be observed as a change in the terminal current and taken out as a signal representing the interference of the two beams when a constant current source is used. Of course, it is also possible to directly observe the change in the impedance by means of an impedance meter.

Thus, by providing a terminal for detecting the change in the current, the voltage or the impedance of the laser, or the change in the frequency of any of them to be more accurate, it is possible to take out a beat signal in response to the rotation. Additionally, according to the invention, the beat frequency increases or decreases according to the sense of rotation in a manner as expressed by equations (3) and (4).

Therefore, it is possible to detect the sense of rotation by observing the increase or the decrease, if any, in the beat frequency from the time when the laser is not yet rotating.

Furthermore, the angular velocity of the laser can be detected in addition to the sense of rotation when $f_2-f_1$ satisfies the relationship expressed by formula (5) below.

$$f_2-f_1 \geq 0 \tag{5}$$

Incidentally, the relationship as expressed by equation (6) below holds true when the oscillation wavelength of the first laser beam 400 and that of the second laser beam 500 are equal to each other.

$$f_{20}-f_{10}=0 \tag{6}$$

Then, the beat frequency $f_2-f_1$ will be either a positive value or a negative value. However, the same signal will be obtained from the terminal so long as the absolute value of the beat frequency remains equal. In that case, it is not possible to detect the sense of rotation of the laser.

However, according to the invention, the sense of rotation can be detected by arranging in such a way that the value of the beat frequency always remains positive or negative (positive in the above description) and only the absolute value of the beat frequency changes depending on the sense of rotation of the laser.

As for a situation where the laser is held stationary, the oscillation frequency $f_{10}$ of the CW beam and the oscillation frequency $f_{20}$ of the CCW beam can be differentiated from each other, or $f_{10} \neq f_{20}$ can be realized, by differentiating the oscillation frequency $f_{30}$ of the third laser beam 300 for injection locking from the oscillation frequency $f_{20}$ of the CCW beam ($f_{30} \neq f_{20}$).

Then, the oscillation frequency $f_{10}$ of the CW beam results in equal to the oscillation frequency $f_{30}$ of the third beam, or $f_{10}=f_{30}$ is realized due to the injection locking, so that consequently $f_{10} \neq f_{20}$ can be realized.

A gyro according to the invention operates on the principle as described above.

Figure 2:
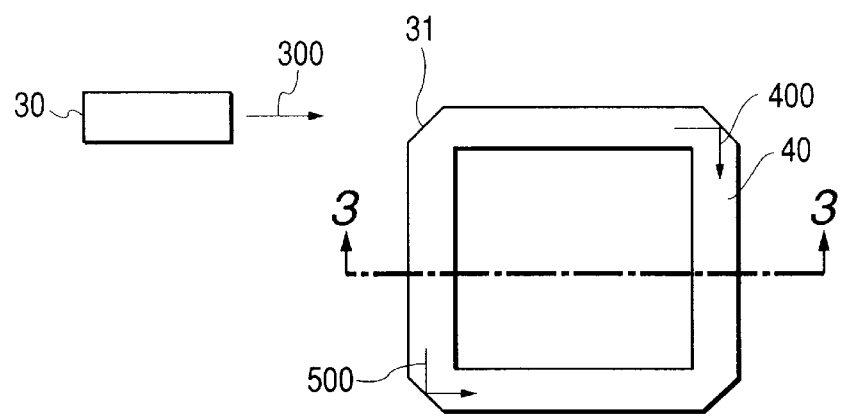
FIG. 2 is a schematic illustration of the gyro according to the invention and described hereinafter in Example 2.

FIG. 2 is a schematic illustration of an embodiment of a gyro according to the invention.

It is a gyro comprising a ring laser 40 for generating a CW beam 400 and a CCW beam 500 that propagate circuitly in opposite directions wherein an electric signal is taken out from the ring laser. The most characteristic aspect of a gyro according to the invention is that a third laser beam 300 having an oscillation frequency (oscillation wavelength) different from that of the CCW beam 500 is led to enter the laser 40 so as to be propagated circuitly in the direction opposite to the CCW beam.

With this arrangement, the oscillation wavelength $\lambda'_1$ of the CW beam 400 becomes equal to that of the third laser beam and hence laser beams with respective oscillation frequencies, or oscillation wavelengths, that are different from each other coexist in the ring laser 40.

Figure 3:
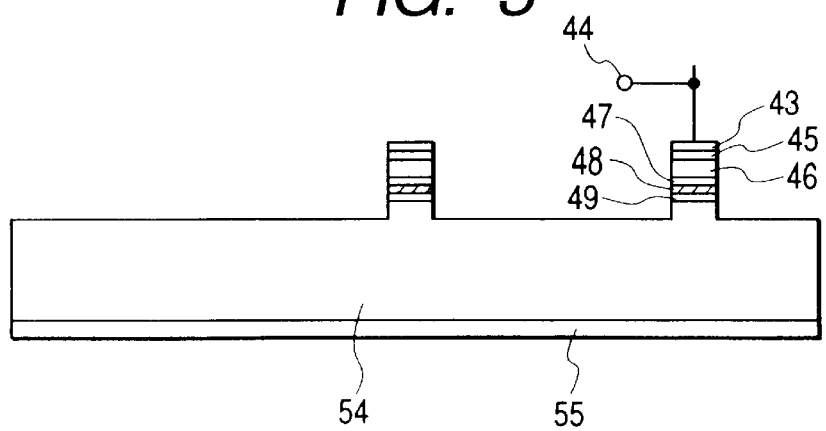
FIG. 3 is a schematic cross sectional view taken along line 3—3 in FIG. 2.

Thus, as described above, a beat frequency can be detected by way of the terminal 44 in FIG. 3 illustrating a cross sectional view of the laser device of FIG. 2 even when the ring laser 40 is held stationary.

Now a technique of leading a third laser beam to enter the ring laser 40 from an optical waveguide 31 (an "injection locking" technique as will be referred to hereinafter) will be discussed below.

Figure 4:
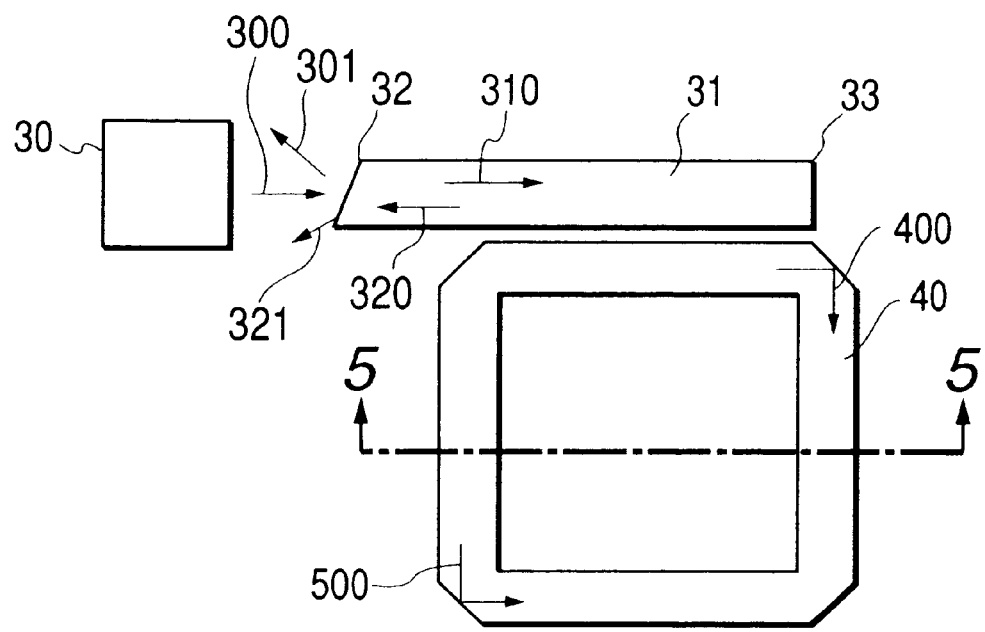
FIG. 4 is schematic illustration of the gyro according to the invention and described hereinafter in Example 3.

As seen from FIG. 4, with this technique, the third laser beam is led not to directly enter the ring laser but to enter another optical waveguide 31. The optical waveguide 31 is located within a distance wherein it is optically coupled to the ring laser 40. Thus, the third laser beam is optically coupled to the ring laser and hence it is led to enter the latter by way of the optical waveguide 31. The third laser beam is then suppressed from being diffracted because it propagates through the optical waveguide 31.

In short, the optical waveguide 31 is located so close to the ring laser such that the laser beam propagating through the optical waveguide is coupled to the ring laser. With this arrangement of placing the optical waveguide and the ring laser in close proximity, the region located in the proximity functions as a directional coupler. As a result, the laser beam propagating through the optical waveguide is coupled to the ring laser.

Preferably, the optical waveguide 31 and the ring laser 40 are separated from each other by a distance less than the penetrating depth of the laser beam propagating through the optical waveguide. When the optical waveguide 31 is separated from the ring laser 40 by a distance less than the penetrating depth of the laser beam, the optical coupling of the ring laser and the optical waveguide shows a high coupling efficiency.

Thus, the third laser beam emitted from its own laser is coupled to the ring laser highly efficiently after passing through the optical waveguide.

With this arrangement, the laser beam emitted from the laser operating as a light source for injection locking needs a low intensity of light and hence the light source for injection locking consumes low electrical power. Such penetrating light is referred to evanescent light.

Figure 6:
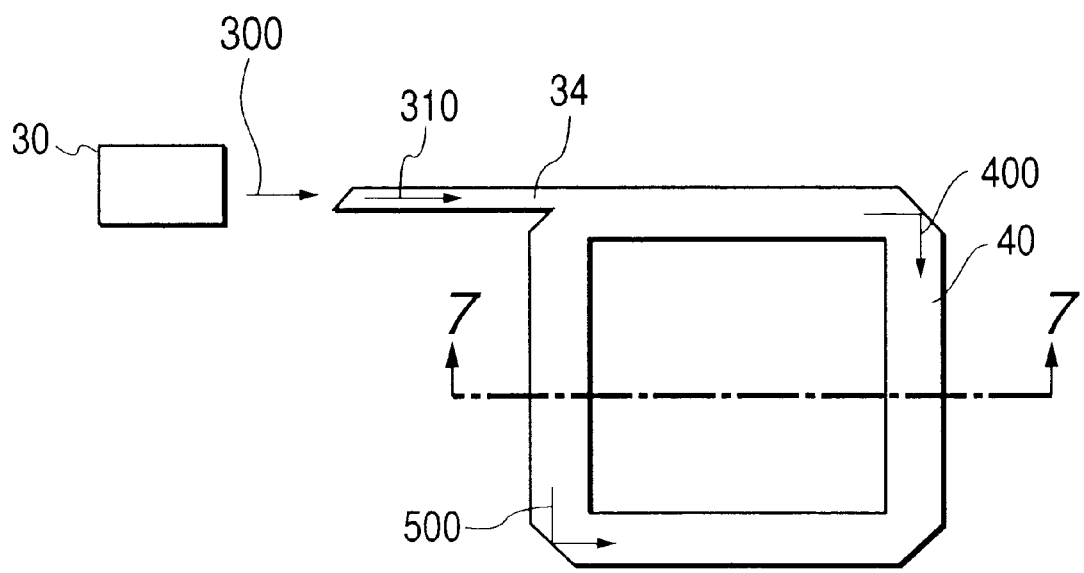
FIG. 6 is a schematic illustration of the gyro according to the invention and described hereinafter in Example 4.

FIG. 6 shows another injection locking technique, with which optical waveguide 34 is connected to the optical waveguide of the ring laser 40. With this arrangement, the laser beam propagating through the optical waveguide 34 can also be coupled to the ring laser 40 highly efficiently. With this arrangement again, the laser beam emitted from the laser operating as a light source for injection locking needs a low intensity of light and hence the light source for injection locking consumes low electrical power.

Note that the end face of the optical waveguide 31 or 34 disposed vis-a-vis the laser 30 is inclined against a plane having a normal of the principal direction of propagation of the laser beam emitted from the laser 30 and that of the laser beam propagating through the optical waveguide. With this arrangement, the laser beam emitted from the laser enters and propagates through the optical waveguide and then the laser beam is optically coupled to the ring laser. At this time, the laser beam is partly reflected by the end facet of the optical waveguide. Then, since the end facet of the optical waveguide is inclined against the plane having a normal of the principal direction of the laser beam, the part of the laser beam reflected by the end facet is prevented from returning to the laser. As a result, any optical feedback noise can be prevented without using an optical isolator. It will be appreciated that the use of an optical isolator is preferable for the purpose of prevention of optical feedback noise when the end facet of the optical waveguide is in parallel with the plane having a normal of the principal direction of propagation of the laser beam.

Now, the electric signal to be detected from the ring laser will be described below. Note that the electric signal may alternatively be detected from a terminal directly connected to the ring laser.

Still alternatively, a photodetector 39 for detecting the interfered beam of the CW beam and the CCW beam propagating circuitally in the ring laser 40 in opposite directions may be arranged outside the ring laser 40 and the electric signal may be taken out from the photodetector 39.

Figure 19A:
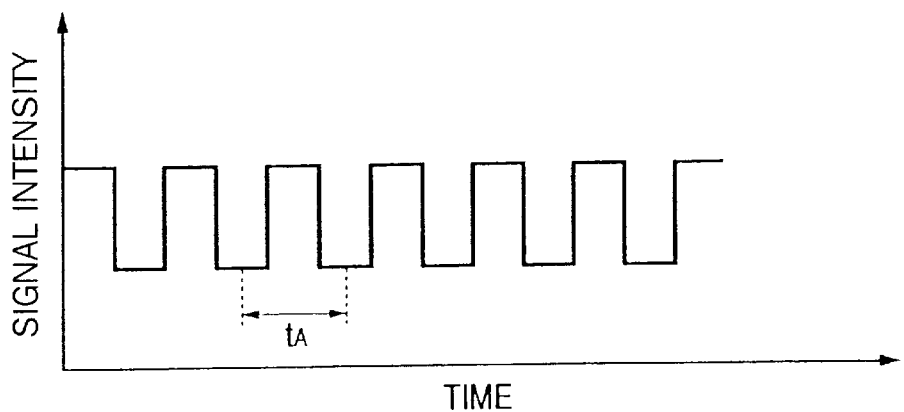
FIGS. 19A, 19B and 19C are schematic illustrations of electric signals of a gyro according to the invention.
Figure 19B:
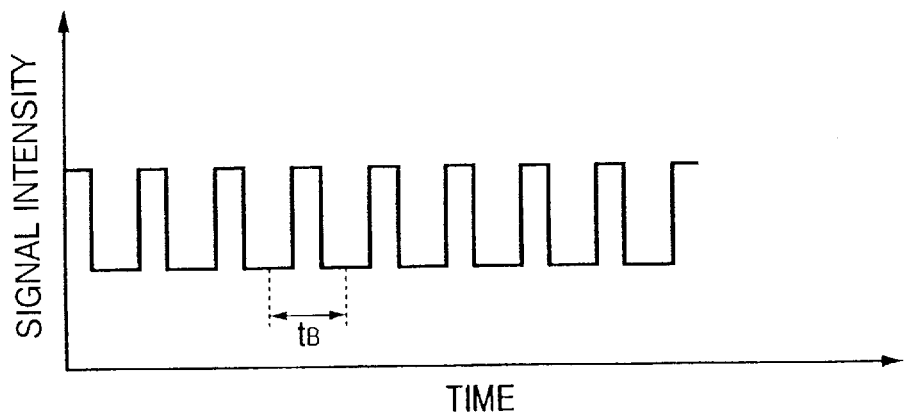
Figure 19C:
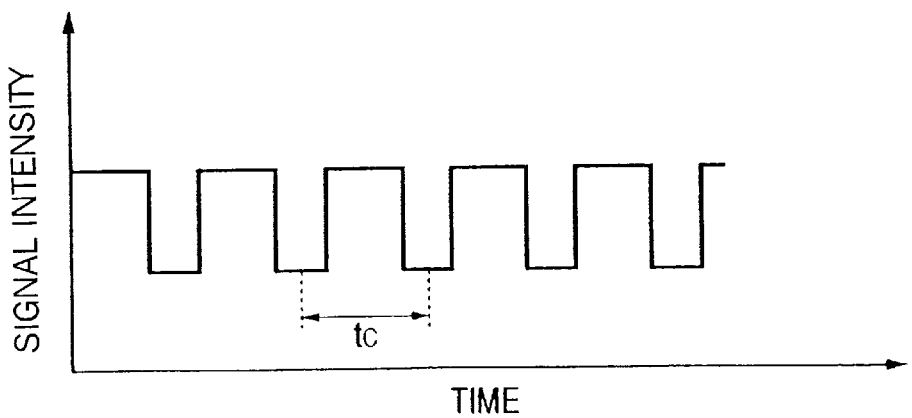

The electric signal obtained when the laser device of the gyro is held stationary changes in a manner as described below when the device is turned clockwise or counterclockwise (FIGS. 19A through 19C). Note that, as in the case of the above description of the principle underlying the operation of a gyro according to the invention, it is assumed that the wavelength $\lambda'_1$ of the CW beam after the injection locking and the wavelength $\lambda_2$ of the CCW beam have the relationship of $\lambda_2 < \lambda'_1$.

FIG. 19A shows the electric signal that can be obtained when the laser device is held stationary. Assume that the electric signal has a period of $t_A$ at a stationary state.

When the laser device is turned clockwise, the beat frequency, or $f_2 - f_1$, is increased according to equation (3) above and hence the electric signal has a period $t_B$ smaller than $t_A$ as shown in FIG. 19B.

When, on the other hand, the laser device is turned counterclockwise, the beat frequency is decreased according to equation (4) above and hence the electric signal has a period $t_c$ greater than $t_A$ as shown in FIG. 19C.

Thus, by comparing the period of the electric signal (or that of the beat frequency) when the laser device is held stationary and the period of the electric signal (or that of the beat frequency) when the laser device is turned, the angular velocity of the object can be determined from the absolute value of the difference and the sense or rotation of the object can be determined from the dimensional relationship of the values of the periods (or the beat frequencies).

Now, techniques that can be used for detecting the electric signal that changes in response to the beat frequency will be discussed below.

As for the electric signal to be taken out from the laser device, it may be a voltage signal when the device is driven by a constant current or it may be a current signal when the device is driven by a constant voltage. Still alternatively, it may be an impedance signal produced by the laser device.

Figure 20:
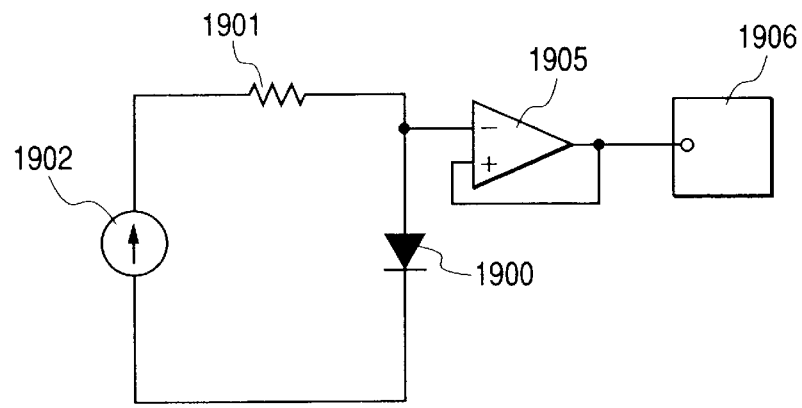
FIG. 20 is a circuit diagram of an electric-signal-detecting circuit that can be used for a gyro according to the invention.

Referring to FIG. 20, a constant current source 1902 is brought in and connected to a laser device of a semiconductor laser device 1900 by way of a resistor 1901. Then, the electric signal (which is a voltage signal) produced by the semiconductor laser 1900 is read by means of a voltage detection circuit 1906. Also note that, whenever necessary, it is preferable that a voltage follower circuit 1905 is provided as a protective circuit as shown in FIG. 20. While the laser device of FIG. 20 is a semiconductor laser in the above description, a gas laser may alternatively be used for the purpose of the present invention.

Figure 21:
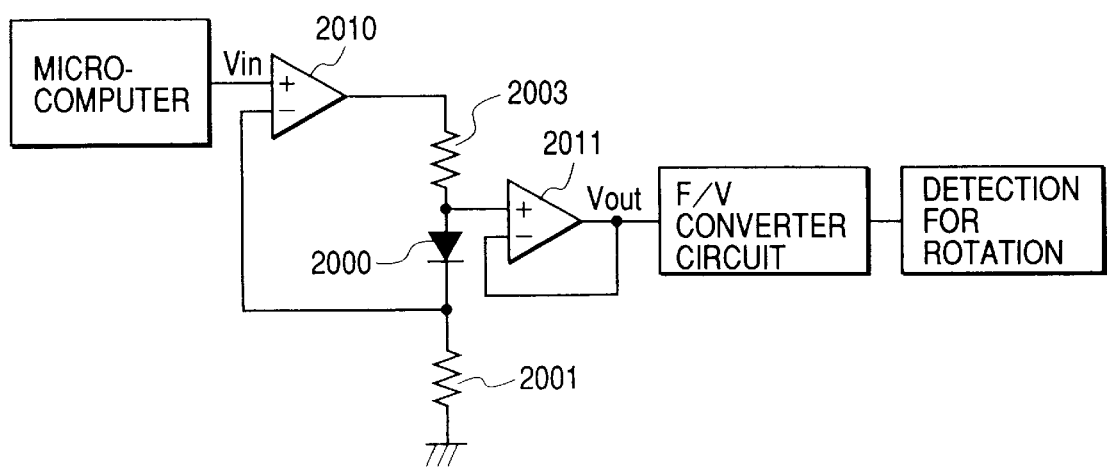
FIG. 21 is a circuit diagram of another electric-signal-detecting circuit that can be used for a gyro according to the invention.

FIG. 21 is a schematic circuit diagram of another arrangement where the laser device is driven also by a constant current and the change in the anode potential of the semiconductor laser 2000 is read out to detect the rotation of the gyro.

Referring to FIG. 21, the anode of the semiconductor laser 2000 is connected to the output terminal of an operational amplifier 2010 by way of a protective resistor 2003 and the cathode of the semiconductor laser 2000 is connected to the inverting input terminal of the operational amplifier 2010.

The operational amplifier 2010 outputs signal Vout that corresponds to input potential Vin typically applied from a microcomputer. Since the signal Vout has a beat frequency that is proportional to the angular velocity, the rotation of the laser device can be detected by converting the signal into a voltage by means of a known frequency/voltage converter circuit (F/V converter circuit)

Figure 9:
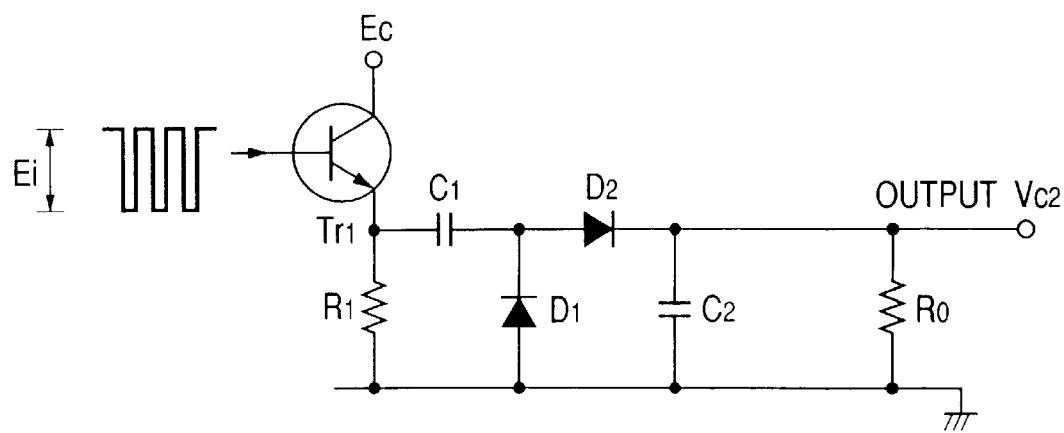
FIG. 9 is a schematic circuit diagram of a frequency/voltage converter circuit.

FIG. 9 is a schematic circuit diagram of a frequency/voltage converter circuit (F/V converter circuit). The circuit comprises a transistor, diodes, capacitors and resistors and the output voltage $V_{c2}$ thereof is expressed by formula (7) below;

$$V_{c2} = E_i C_1 R_0 f [1 + 1/\{1 - \exp(-1/R_0 C_2 f)\}] \quad (7)$$

where $E_i$ represents the peak-to-peak value of the input voltage and f represents the beat frequency. By selecting values that satisfy $C_2 \gg C_1$ and $R_0 C_2 f \ll 1$ for the circuit parameters, the relationship as expressed by equation (8) below is achieved to obtain a voltage output that is proportional to the beat frequency.

$$V_{c2} = E_i C_1 R_0 f / 2 \quad (8)$$

Now, the arrangement for detecting the rotation of the laser device through the change in the electric current will be discussed below.

Figure 23:
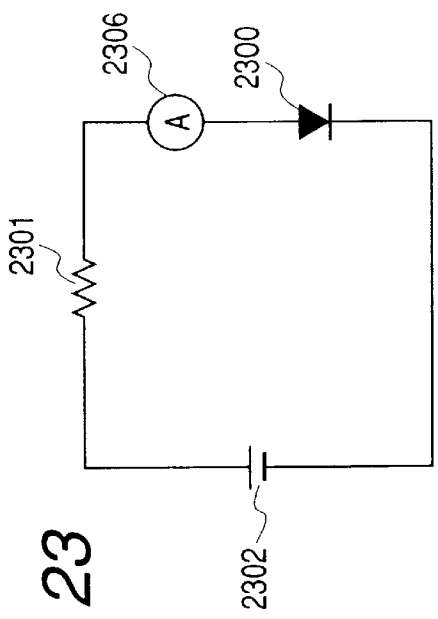
FIG. 23 is a circuit diagram of still another electric-signal-detecting circuit that can be used for a gyro according to the invention.
Figure 22:
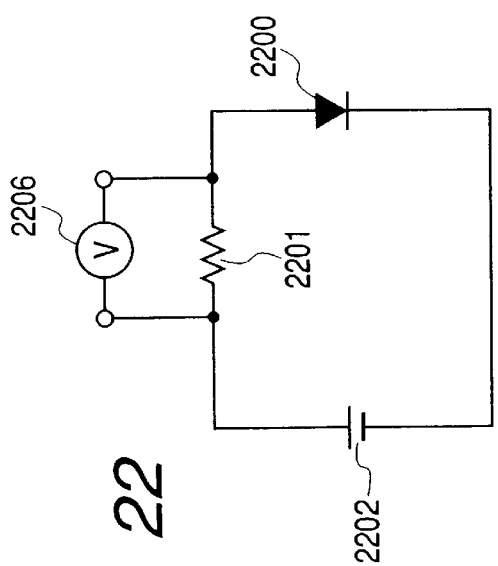
FIG. 22 is a circuit diagram of still another electric-signal-detecting circuit that can be used for a gyro according to the invention.

The angular velocity of the rotating laser device can be determined by detecting the change in the electric current flowing through the semiconductor laser by using a constant voltage source as a power source. A compact and lightweight drive system can be obtained for the laser device by using a battery for the constant voltage source as shown in FIG. 22 or 23. In the circuit of FIG. 22, the semiconductor laser 2200 is connected to a resistor 2201 in series so that the change in the electric current flowing through the semiconductor laser can be determined as the change in the voltage between the opposite ends of the electric resistor. In FIG. 22, reference numeral 2202 denotes a battery and reference numeral 2206 denotes a voltmeter. In the circuit of FIG. 23, on the other hand, the semiconductor laser 2300 is connected to an ammeter 2306 in series to directly observe the electric current flowing through the semiconductor laser. In FIG. 23, reference numeral 2301 and 2302 denote an electric resistor and a battery, respectively.

Now, another circuit configuration that can be used for detecting a beat signal for the purpose of the invention will be discussed below.

Figure 24:
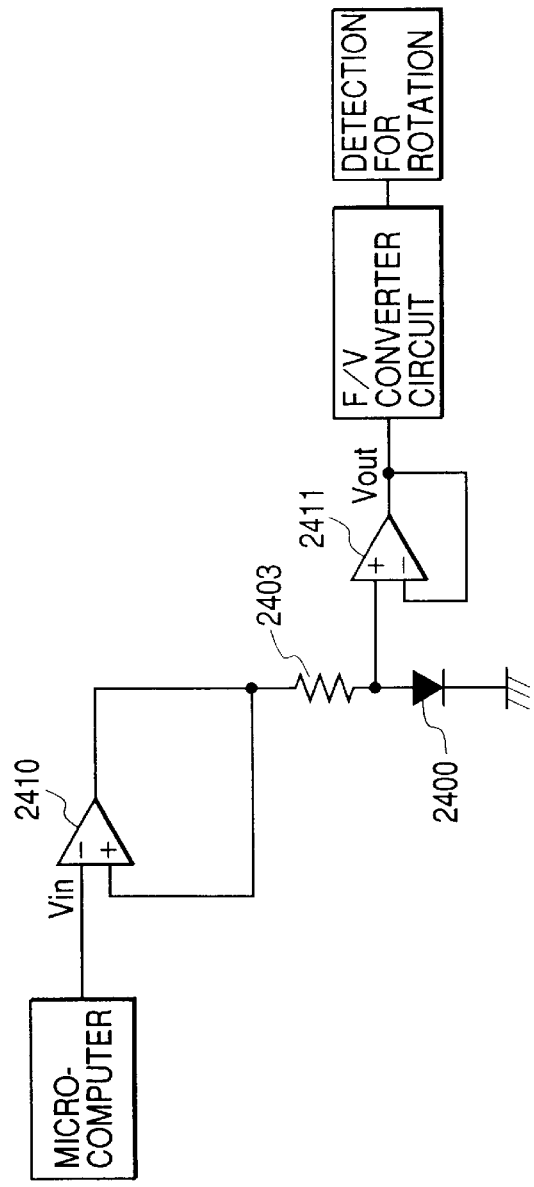
FIG. 24 is a circuit diagram of still another electric-signal-detecting circuit that can be used for a gyro according to the invention.

FIG. 24 is a circuit diagram of a circuit for detecting the rotation of a semiconductor laser 2400 by applying a constant voltage thereto in order to drive it and read the change in the anode potential of the semiconductor laser 2400.

The anode of the laser 2400 is connected to the output terminal of an operational amplifier 2410 by way of a resistor 2403 and the cathode of the laser 2400 is grounded to have a reference potential.

A constant voltage drive arrangement can be obtained by applying a constant potential (Vin) to the inverting input terminal of the operational amplifier 2410 by means of, for instance, a microcomputer, so that the potential is constantly applied to the resistor 2403 and the laser 2400.

The electric resistor 2403 is connected to another operational amplifier 2411 that operates as a buffer.

The operational amplifier 2411 outputs signal Vout, which signal has a beat frequency that is proportional to the angular velocity so that the rotation of the laser device can be detected by changing the frequency into a voltage by means of a known frequency/voltage converter circuit (F/V converter circuit). It may be needless to say that it is also possible to detect the rotation of the laser device by applying the signal obtained at a point equipotential with the electric resistor 2403 directly to the F/V converter circuit without passing through the operational amplifier 2411. A frequency counter circuit may be used as a beat signal detection circuit.

Figure 25:
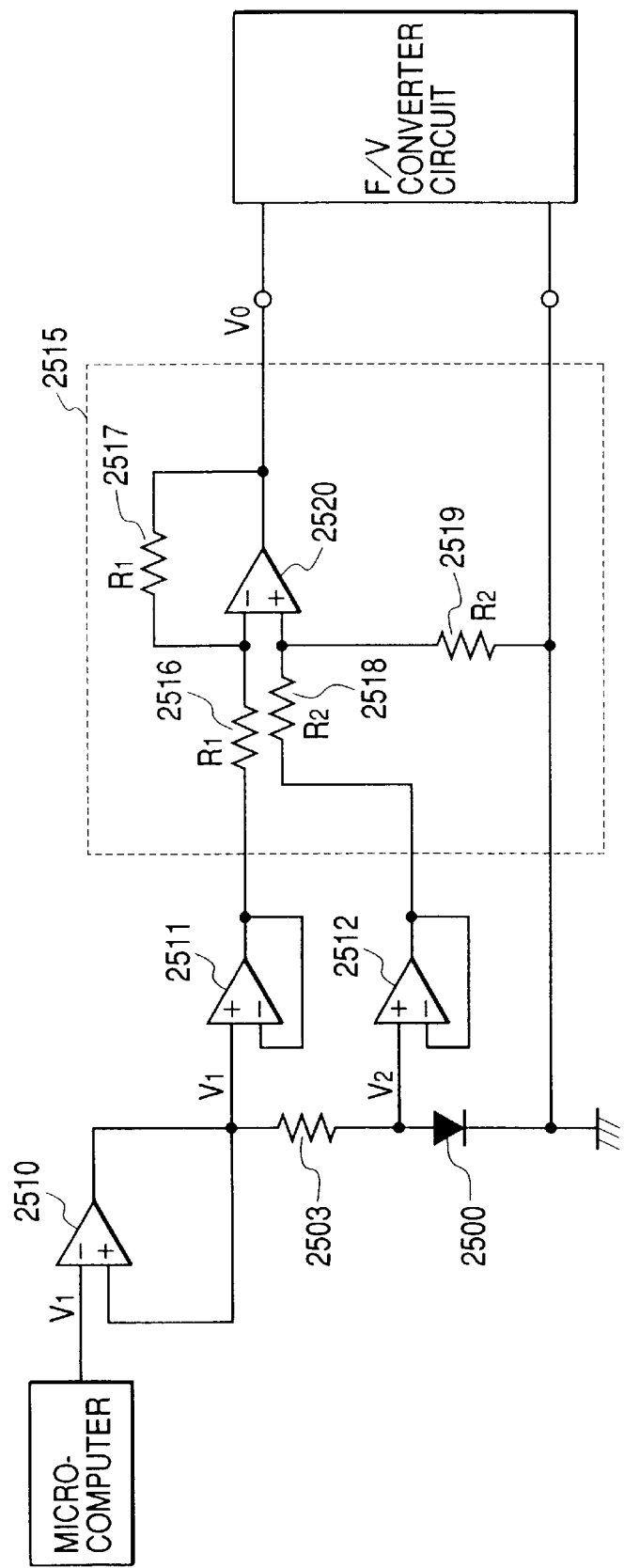
FIG. 25 is a circuit diagram of still another electric-signal-detecting circuit that can be used for a gyro according to the invention.

FIG. 25 shows a circuit diagram of a circuit which takes the ground potential as a reference potential for the signal by using a subtraction circuit 2515 in addition to the constant voltage drive arrangement as described above by referring to FIG. 24.

Referring to FIG. 25, a constant voltage $V_1$ is applied to the inverting input terminal of operational amplifier 2510 by means of, for instance, a microcomputer. In FIG. 25, reference numeral 2500 denotes a laser device and reference numerals 2511 and 2512 denote respective voltage followers, while reference numerals 2503 and 2516 through 2519 respectively denote electric resistors. The resistors 2516 and 2517 have the same electric resistance, whereas resistors 2518 and 2519 also have the same electric resistance.

The potentials $V_1$ and $V_2$ at the opposite ends of the electric resistor 2503 are applied respectively to the inverting input terminal and the noninverting input terminal of the operational amplifier 2520 by way of the voltage followers 2511, 2512 and the resistors 2516 and 2518. With this arrangement, the change in the voltage $V_2-V_1$ ($=V_0$) being applied to the resistor 2503 can be detected to find out the change in the electric current flowing through the laser device 2500 by using the ground potential as a reference potential.

Then, the rotation of the laser device can be detected from the obtained signal after letting it pass through an F/V converter circuit.

Figure 26:
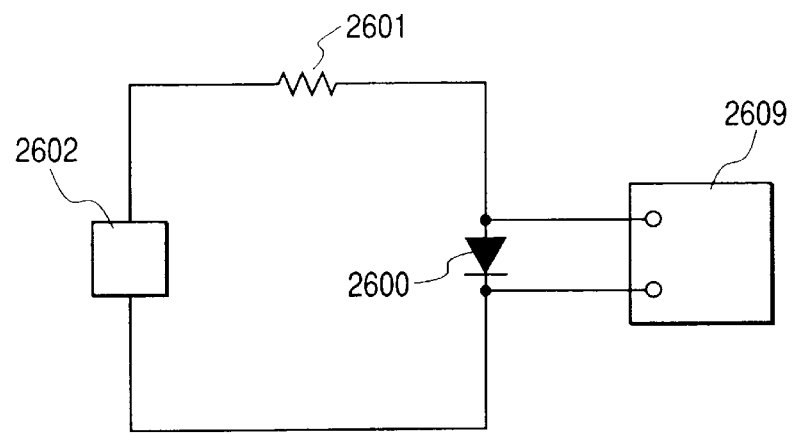
FIG. 26 is a circuit diagram of still another electric-signal-detecting circuit that can be used for a gyro according to the invention.

It is also possible to observe the change in the impedance of the semiconductor laser 2600 directly by means of an impedance meter 2609 as shown in FIG. 26 regardless of the type of the power source. In FIG. 26, reference numeral 2602 denotes a power source. With this arrangement, the influence of the noise of the drive power source can be reduced unlike the case where the terminal voltage applied to or the electric current flowing through the laser device is observed.

Although the above description is for the case of semiconductor lasers, gas lasers can be described in the same manner.

To reduce the oscillation threshold value of the ring laser, the lateral surfaces of the ring laser are preferably total reflection planes.

For the operation of injection locking, the difference between the oscillation frequency of the CW beam and that of the CCW beam is preferably greater than 100 Hz, more preferably greater than 1 kHz, most preferably greater than 10 kHz in order to avoid the lock-in phenomenon.

While various arrangements for detecting the rotation of a laser device is described above in terms of a semiconductor laser, it will be appreciated that the above description equally applies to a gas laser.

EXAMPLES

Now, the present invention will be described by way of examples and also by referring to the accompanying drawings.

Example 1

Figure 1:
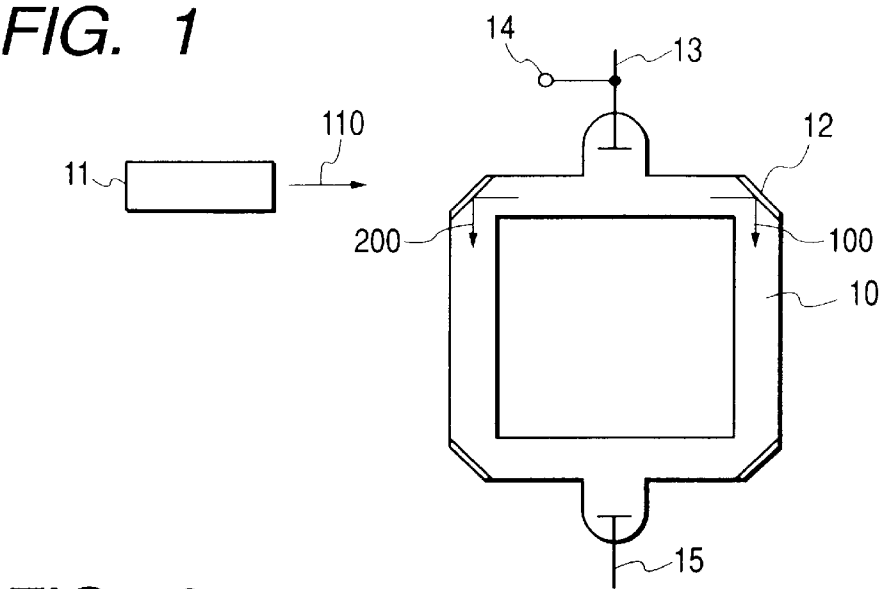
FIG. 1 is a schematic illustration of the gyro according to the invention and described hereinafter in Example 1.

FIG. 1 is a schematic illustration of the first example of the invention, most clearly showing its characteristic aspects. Referring to FIG. 1, the laser device of this example comprises a quartz tube 10, mirrors 12, an anode 13, an electric terminal 14 and a cathode 15. Reference numeral 100 denotes a laser beam propagating circuitally clockwise (CW beam) and reference numeral 110 denotes a third laser beam, whereas reference numeral 200 denotes a laser beam propagating circuitally counterclockwise (CCW beam).

Of the laser device having the above described configuration, the quartz tube 10 was formed by hollowing a quartz block by means of a drill. Thereafter, the mirrors 12 were fitted to the quartz tube 10. Additionally, the anode 13, the electric terminal 14 and the cathode 15 were also fitted to the quartz tube 10. Subsequently, helium gas and neon gas were introduced into the quartz tube 10 and a voltage was applied between the anode and the cathode to give rise to an electric discharge and cause an electric current to flow. As a result, the counterclockwise laser beam 200 and the clockwise laser beam 100 oscillated in the quarts tube 10.

When the quartz tube 10 is held stationary, the laser beam 100 and the laser beam 200 show a substantially identical oscillation frequency of $4.73 \times 10^{14}$ Hz and an identical wavelength $\lambda$ of 632.8 nm.

The oscillation frequency $f_0$ of the third laser beam emitted from the laser 11 for injection locking is greater than the oscillation frequency $f_1$ of the laser beam 100 by 20 MHz. Under this condition, the laser beam 110 emitted from the laser 11 is led to enter the quartz tube 10. The laser beam 110 and the laser beam 100 interact with each other in the region of the inside of the quartz tube 10 where the laser beam 110 and the laser beam 100 propagate in the same direction.

As a result, the laser beam 100 is pulled into the laser beam 110 and the oscillation frequency of the laser beam 100 becomes equal to the oscillation frequency $f_0$ of the laser beam 110 to give rise to an effect of injection locking. As a result of the injection locking, the oscillation frequency of the laser beam 100 propagating through the quartz tube 10 clockwise becomes greater than that of the counterclockwise laser beam 200 by 20 MHz.

Then, an interfered beam having a beat frequency of 20 MHz is generated in the quartz tube 10. If a constant current source is used, a signal having an amplitude of 100 mV and a frequency of 20 MHz can be obtained by monitoring the voltage between the electrode terminal 14 and the cathode 15. In other words, a beat voltage can be detected even when the quartz tube is held stationary.

If the quartz tube 10 is driven to rotate clockwise at a rate of 180° per second and each side of the quartz tube 10 is 10 cm long, the oscillation frequency $f_2$ of the laser beam 200 propagating counterclockwise is raised by 248.3 kHz, while, on the other hand, the oscillation frequency $f_1$ of the laser beam 100 propagating clockwise is not changed because it is subjected to injection locking. Then, the beat frequency can be obtained by formula (9) below.

$$f_1 - f_2 = 20 \text{ MHz} - 248.3 \text{ kHz} \tag{9}$$

In the case where, on the other hand, the quartz tube 10 is driven to rotate counterclockwise at a rate of 180° per second, the beat frequency can be obtained by formula (10) below.

$$f_1 - f_2 = 20 \text{ MHz} + 248.3 \text{ kHz} \tag{10}$$

Since the absolute value of the increase or the decrease of the beat frequency is proportional to the rotation speed, it is now possible to detect not only the rotation speed of the semiconductor laser but also the sense or rotation because the increase or the decrease in the beat frequency shows a one-to-one correspondence with the sense or rotation.

While the change in the terminal voltage is observed by driving the gyro with a constant current in this example, the change in the electric current flowing to the terminal can be observed if the gyro is driven with a constant voltage. Alternatively, the change in the discharge impedance can be directly detected by means of an impedance meter.

While helium gas and neon gas were introduced into the quartz tube in this example, they may be replaced by any gas that can give rise to a laser oscillation. Additionally, the profile of the optical waveguide may be hexangular, triangular or circular instead of being rectangular.

Example 2

FIG. 2 is a schematic illustration of the second example of the invention, most clearly showing its characteristic aspects. FIG. 3 is a schematic cross sectional view of the laser device of FIG. 2 taken along line 3—3 in FIG. 2. In FIGS. 2 and 3, there are shown a semiconductor laser 30, a ring resonator type semiconductor laser 40 that comprises an anode 43, an electric terminal 44, a cap layer 45, a cladding layer 46, an optical guiding layer 47, an active layer 48, another optical guiding layer 49, a semiconductor substrate 54 and a cathode 55. Reference numeral 300 denotes a third laser beam and reference numeral 400 denotes a laser beam propagating circuitally clockwise whereas reference numeral 500 denotes a laser beam propagating circuitally counterclockwise.

Firstly, the method for preparing the semiconductor laser for injection locking and the ring resonator type semiconductor laser having the above described configuration will be described. An updoped InGaAsP optical guiding layer 49 having a 1.3 μm composition (0.15 μm thick), an undoped InGaAsP active layer 48 having a 1.55 μm composition (0.1 μm thick), another undoped InGaAsP optical guiding layer 47 having a 1.3 μm composition (0.15 μm thick), a p-InP cladding layer 46 (2 μm thick) and a p-InGaAsP cap layer 45 having a 1.4 μm composition (0.3 μm thick) were grown on an n-InP substrate 54 (350 μm thick) by means of a metal organic vapor phase epitaxy for both the semiconductor laser 30 for injection locking and the ring resonator type semiconductor laser 40.

While the semiconductor layers common to the semiconductor laser 30 and the ring resonator type semiconductor laser 40 were grown simultaneously in the example, they may alternatively be made to grow separately.

After the crystal growth process, photoresist AZ-1350 (tradename, available from Hoechst) was coated on the p-InGaAsP cap layer by means of a spin coater to obtain a film thickness of 1 μm. After prebaking the wafer at 80° C. for 30 minutes, it was exposed to light with a mask covering it. After the development and rinsing processes, the circuital optical waveguide of the ring resonator type semiconductor laser 40 had a width of 5 μm and a circuital length of 600 μm, whereas optical waveguide of the semiconductor laser 30 had a width of 5 μm and a circuital length of 300 μm.

Subsequently, the wafer was introduced into a reactive ion beam etching system and etched to have a hollow section with a depth of 3 μm by means of chlorine gas. Finally, Cr/Au was formed on the p-InGaAsP cap layer 45 by deposition in order to produce an anode 43 thereon, while AuGe/Ni/Au was formed on the n-InP substrate also by deposition in order to produce a cathode 55 thereon. Thereafter, the wafer was annealed in a hydrogen-containing atmosphere to have an ohmic contact.

Light incident upon the ring resonator type semiconductor laser having the above described configuration is reflected by the interface of the semiconductor and the air, because of the difference in the refractive index of the semiconductor and that of air. If the refractive index of the semiconductor is 3.5, a total reflection occurs when the angle between the normal to the interface and the laser beam is equal to or greater than 16.6°.

Since the mode of oscillation to cause the total reflection gives an oscillation threshold value smaller than any other modes because of a reduced mirror loss, the laser device begins oscillating with a low injected current level.

Additionally, since optical gain concentrates to this oscillation mode, oscillations in any other modes will be suppressed. The angle between the normal to the interface of the semiconductor and air is 45° at any corner of the semiconductor laser and hence satisfies the angular requirement for total reflection in the above ring resonator type semiconductor laser 40.

If it is desired to reduce the loss of light and drive the laser device with a low electric current or a low voltage, the loss of light in the low refractive index layers sandwiching the active layer should be minimized.

Figure 27:
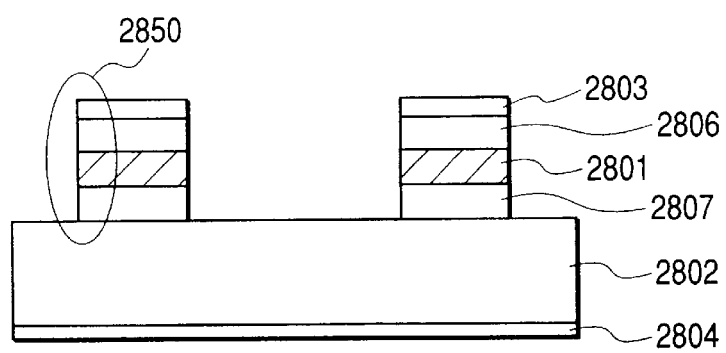
FIG. 27 is a schematic cross sectional view of a gyro according to the invention.

This will be discussed in detail by referring to FIG. 27. In FIG. 27, reference numeral 2801 denotes an active layer and reference numerals 2806 and 2807 denote respective low refractive index layers, whereas reference numerals 2803 and 2804 denote respective electrodes and reference numeral 2802 denotes a substrate.

Figure 28:
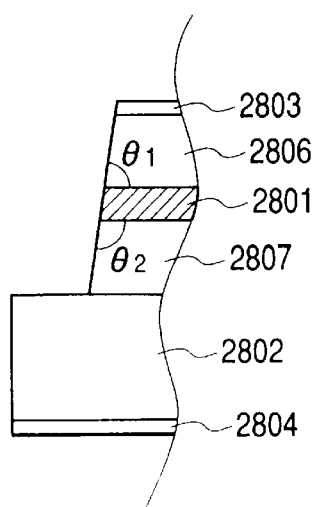
FIG. 28 is an enlarged schematic cross sectional view of the gyro of FIG. 27, showing a part thereof.
Figure 29:
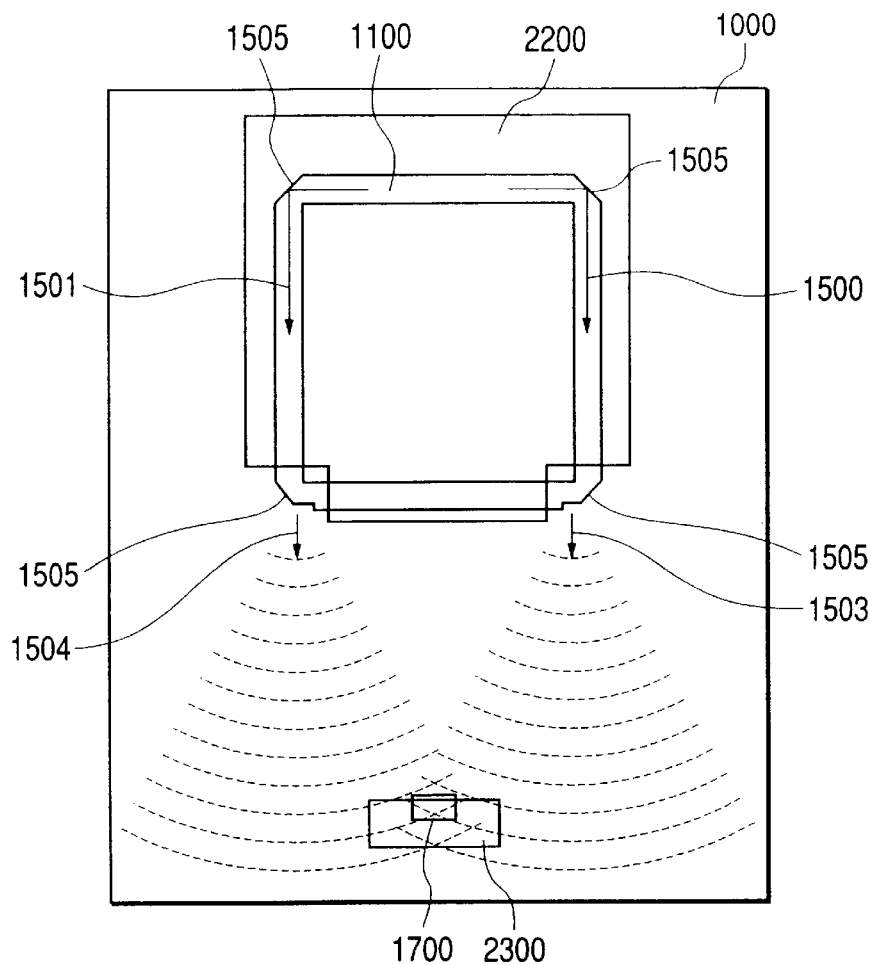
FIG. 29 is a schematic illustration of a prior art gyro.
Figure 30:
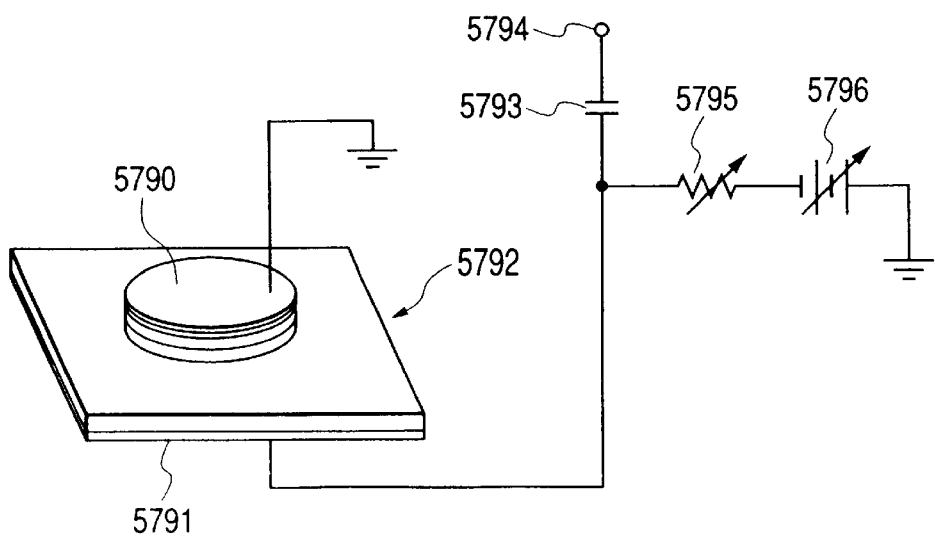
FIG. 30 is a circuit diagram of a prior art gyro.

FIG. 28 is an enlarged schematic cross sectional view of region 2850 of the laser device of FIG. 27. When the device is driven with low electric power, the laser device should be prepared in such a way that the angles $\theta_1$ and $\theta_2$ between the respective lateral surfaces of the low refractive index layers and that of the active layer (FIG. 28) satisfy $$75° \leq \theta_1 \text{ and } \theta_2 \leq 105°,$$

$$\text{preferably } 80° \leq \theta_1 \text{ and } \theta_2 \leq 100°,$$

$$\text{most preferably } 85° \leq \theta_1 \text{ and } \theta_2 \leq 95°.$$

When the above requirements are met, any loss of light penetrating into the low refractive index layers 2806, 2807 (evanescent light) can effectively be avoided to make it possible to drive the semiconductor laser with a low electric current (or a low voltage).

Additionally and desirably, the lateral surfaces of the semiconductor laser are total reflection surfaces and the angles between the areas that are more than 90% of the total reflection surfaces and that of the active layer are defined by the above formulas.

It is also desirable that the lateral surfaces of the refractive index layers satisfy the above requirements with the corresponding lateral surface of the active layer for all the periphery thereof. Particularly, it is highly desirable that the inner lateral surfaces of the laser device also satisfy the above requirements for angles $\theta_1$ and $\theta_2$.

The surface precision (surface coarseness) of the lateral surfaces of the low refractive index layers sandwiching the active layer 2801 is preferably less than a half, more preferably less than a third, of the wavelength of light transmitting through the transmission medium of the active layer (=wavelength of light in vacuum/effective refractive index of the medium). Specifically, if the active layer is an InP type layer (with a wavelength of 1.55 μm and an effective refractive index of 3.6 in the medium), the surface precision is preferably less than about 0.22 μm, more preferably less than 0.14 μm.

If the active layer is a GaAs type layer (with a wavelength of 0.85 μm and an effective refractive index of 3.6), the surface precision is preferably less than about 0.12 μm, more preferably less than 0.08 μm.

In FIG. 2, the oscillation threshold current of the ring resonator type semiconductor laser 40 at room temperature is 2 mA, while the oscillation threshold current of the semiconductor laser 30 is 10 mA.

In this example, a drive current of 20 mA was used for the semiconductor laser 30, while a drive current of 3 mA was used for the ring resonator type semiconductor laser 40.

When the laser device is held stationary and the semiconductor laser 30 for injection locking is not emitting any laser beam 300, the laser beam 400 and the laser beam 500 shows the same oscillation wavelength in the ring resonator type semiconductor laser 40, which is equal to 1.55 μm.

On the other hand, the oscillation frequency $f_3$ of the laser beam 300 emitted from the semiconductor laser 30 is greater than the oscillation frequency $f_4$ of the laser beam 400 by 1 kHz. When the laser beam 300 is introduced into the ring resonator type semiconductor laser 40 under this condition, the two laser beams interact with each other in the region where the laser beam 300 and the laser beam 400 propagate in the same direction. As a result, the laser beam 400 is pulled to the laser beam 300 to give rise to an effect of phenomenon of injection locking that makes the oscillation frequencies of the two laser beams equal to each other. Then, the oscillation frequency of the laser beam 400 propagating clockwise becomes greater than that of the laser beam 500 propagating counterclockwise by 1 kHz to consequently generate an interfered beam having a beat frequency of 1 kHz in the ring resonator type semiconductor laser 40.

If a constant current source is used, a signal having an amplitude of 100 mV and a frequency of 1 kHz can be obtained by monitoring the voltage between the electrode terminal 44 and the cathode 55. In other words, a beat voltage can be detected even when the ring resonator type semiconductor laser 40 is held stationary.

If the ring resonator type semiconductor laser 40 is driven to turn clockwise at a rate of 30° per second which roughly corresponds to the rate of vibration of a camera being shaken by hand or that of a moving automobile, the oscillation frequency $f_5$ of the laser beam 500 propagating counterclockwise is raised by 88.7 Hz, while, on the other hand, the oscillation frequency $f_4$ of the laser beam 400 propagating clockwise is not changed because of the injection locking. Then, the beat frequency can be obtained by formula (11) below.

$$f_4 - f_5 = 1 \text{ kHz} - 88.7 \text{ Hz} \tag{11}$$

In the case where, on the other hand, the ring resonator type semiconductor laser is driven to turn counterclockwise at a rate of 30° per second, the beat frequency can be obtained by formula (12) below.

$$f_3 - f_4 = 1 \text{ kHz} - 88.7 \text{ Hz} \tag{12}$$

Since the absolute value of the increase or the decrease in the beat frequency is proportional to the rotation speed, it is now possible to detect not only the rotation speed of the semiconductor laser but also the sense or rotation because the increase or the decrease in the beat frequency has a one-to-one correspondence with the sense or rotation.

While the change in the terminal voltage is observed by driving the gyro with a constant current in this example, the change in the electric current flowing to the terminal can be observed if the gyro is driven with a constant voltage. Alternatively, the change in the discharge impedance can be directly detected by means of an impedance meter.

While an InGaAsP type semiconductor material is used in this example, a semiconductor material of any other type selected from the GaAs type, the ZnSe type, the InGaN type, the AlGaN type, the InP type, the GaN type and other types may alternatively be used for the purpose of the invention. Additionally, the profile of the optical path of the optical waveguide may be hexangular, triangular or circular in stead of being rectangular. Still additionally, the semiconductor laser 30 may have the Fabry-Perot type structure, the DFB structure or some other structure. Alternatively, it may be a variable wavelength laser. As for the control of the transverse mode, it may have a ridge type structure, a rib type structure, a buried type structure or some other structure.

Example 3

Figure 5:
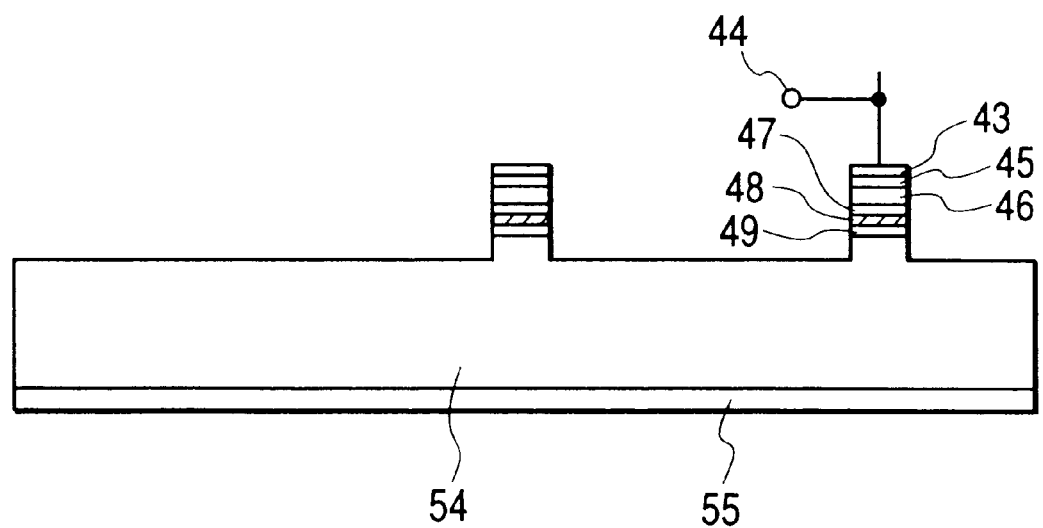
FIG. 5 is a schematic cross sectional view taken along line 5—5 in FIG. 4.

FIG. 4 is a schematic illustration of the third example of the invention, most clearly showing its characteristic aspects. In FIG. 4, reference numeral 31 denotes the optical waveguide for coupling the third laser beam 300 to the ring laser 40 and reference numerals 32 and 33 respectively denote the opposite end facets of the optical waveguide 31, whereas reference numerals 301, 310, 320 and 321 denote respective laser beams. Note that FIG. 5 is a schematic cross sectional view of the laser device of FIG. 4 taken along line 5—5 in FIG. 4.

The laser beam 300 emitted from the laser 30 is led to enter the optical waveguide 31.

Then, the laser beam is optically coupled to the optical waveguide, and therefore, it is confined within and propagate through the optical waveguide 31 without being dispersed by diffraction. The end facet 32 of the optical waveguide 31 is inclined against a plane having a normal of the principal direction of propagation of the laser beam 300 by 7 degrees or more. Thus, the part of the laser beam 300 that is reflected by the end facet of the optical waveguide, or the laser beam 301 in FIG. 4, does not return to the semiconductor laser 30.

Then, the laser beam 320 in FIG. 4 formed by the part of the laser beam 310 reflected by the other end facet 33 of the optical waveguide 31 and the part of the laser beam 500 of the ring laser coupled to the optical waveguide 31 also changes its direction of propagation and is emitted to the outside from the end facet 32 as a laser beam 321 in FIG. 4. This laser beam 321 does not return to the semiconductor laser 30 either.

While the end facet 33 is perpendicular to the principal direction of propagation of laser beams in FIG. 4, it may also be inclined against a plane having a normal of the principal direction of propagation of laser beams.

As a laser beam propagates through the optical waveguide 31, a total reflection occurs at the interface of the optical waveguide. When the total reflection occurs, there exists evanescent light creeping along the interface. If the oscillation wavelength is 1.55 μm, the penetrating depth of the evanescent light is 0.075 μm. The intensity of the evanescent light attenuates exponentially (the penetrating depth being the distance at which the electric field amplitude attenuates to 1/e, where e is the base of natural logarithm).

Since the ring resonator type lasers 40 and the optical waveguide 31 are separated by 0.07 μm which is smaller than the penetrating depth, the laser beam 310 is coupled to the ring resonator type semiconductor laser 40 efficiently. As a result, the intensity of the laser beam 300 required for the laser beam 400 to be pulled to the laser beam 310 can be lower than that of the second example. The drive current of the semiconductor laser 30 was 18 mA.

When a constant current source is used, a signal having an amplitude of 100 mV and a frequency of 1 kHz can be obtained by monitoring the voltage between the electrode terminal 44 and the cathode 55 as in the case of Example 2. In other words, a beat voltage can be detected even when the ring resonator type semiconductor laser 40 is held stationary.

The same signal as that of Example 2 can be obtained when the ring resonator type semiconductor laser 40 is driven to turn clockwise at a rate of 30° per second which roughly corresponds to the rate of vibration of a camera being shaken by hand or that of a moving automobile.

Example 4

Figure 7:
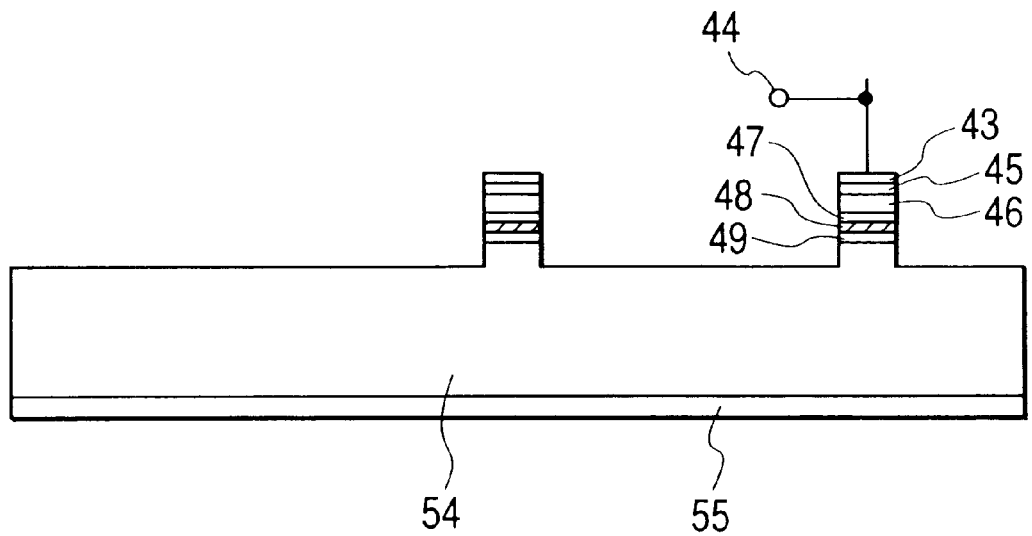
FIG. 7 is a schematic cross sectional view taken along line 7—7 in FIG. 6.

FIG. 6 is a schematic illustration of the fourth example of the invention, most clearly showing its characteristic aspects. In FIG. 6, reference numeral 34 denotes the optical waveguide connected to a ring resonator type semiconductor laser 40. Note that FIG. 7 is a schematic cross sectional view of the laser device of FIG. 6 taken along line 7—7 in FIG. 6.

Since the optical waveguide 34 is connected to the ring resonator type semiconductor laser, the laser beam 310 is coupled to the ring resonator type semiconductor laser 40 efficiently. Consequently, the intensity of the laser beam 300 required for the laser beam 400 to be pulled to the laser beam 310 can be low. As a result, the drive current of the semiconductor laser 30 was 15 mA.

When a constant current source is used, a signal having an amplitude of 100 mV and a frequency of 1 kHz can be obtained by monitoring the voltage between the electrode terminal 44 and the cathode 55 as in the case of Example 2. In other words, a beat voltage can be detected even when the ring resonator type semiconductor laser 40 is held stationary.

The same signal as that of Example 2 can be obtained when the ring resonator type semiconductor laser 40 is driven to turn clockwise at a rate of 30° per second which roughly corresponds to the rate of vibration of a camera being shaken by hand or that of a moving automobile.

Example 5

Figure 8:
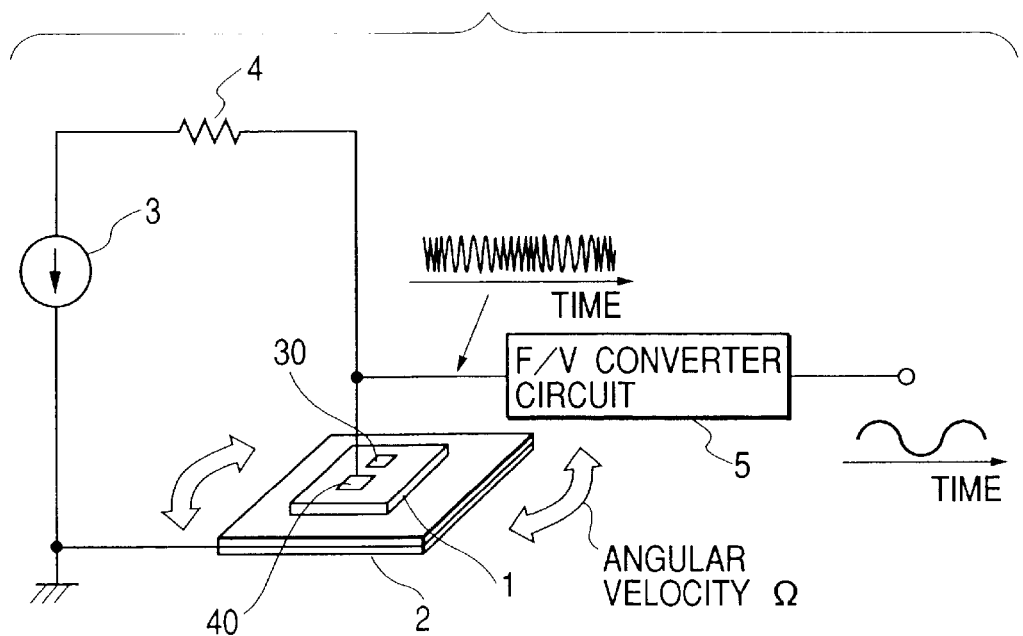
FIG. 8 is a schematic illustration of the gyro according to the invention and described hereinafter in Example 5.

FIG. 8 is a schematic illustration of the fifth example of the invention, most clearly showing its characteristic aspects. Referring to FIG. 8, there are shown an optical gyro 1, a rotary table 2, a current source 3, an electric resistor 4 and a frequency/voltage converter circuit (F/V converter circuit) 5.

With the above arrangement, an electric current is injected into the optical gyro 1 from the current source 3 by way of the resistor 4 that is connected in series. Even if the optical gyro 1 is held stationary, a beat signal representing the difference between the oscillation frequencies of the two laser beams in the optical gyro 1 can be obtained as a change in the terminal voltage. When the optical gyro 1 that is mounted on the rotary table 2 is driven to rotate, the obtained beat signal represents the angular velocity of the rotation of the gyro.

The beat frequency can be converted into a voltage value by causing the beat signal to pass through the frequency/voltage converter circuit (F/V converter circuit) 5. If the voltage output of the frequency/voltage converter circuit (F/V converter circuit) 5 is set to zero when the optical gyro 1 is held stationary by regulating the offset, the sense of rotation of the gyro can be detected by whether the output of the frequency/voltage converter circuit (F/V converter circuit) 5 is positive or negative.

FIG. 9 is a schematic circuit diagram of a frequency/voltage converter circuit (F/V converter circuit). The circuit comprises a transistor, diodes, capacitors and resistors and the output voltage $V_{c2}$ thereof is expressed by formula (13) below;

$$V_{c2}=E_i C_1 R_0 f[1+1/\{1-\exp(-1/R_0 C_2 f)\}] \tag{13}$$

where $E_i$ represents the peak-to-peak value of the input voltage and f represents the beat frequency.

Example 6

Figure 10:
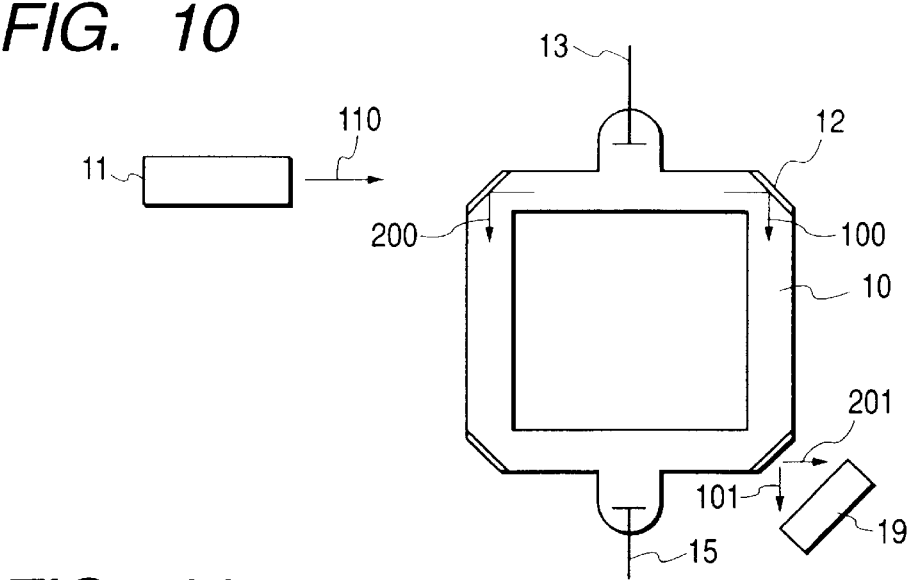
FIG. 10 is a schematic illustration of the gyro according to the invention and described hereinafter in Example 6.

FIG. 10 is a schematic illustration of the sixth example of the invention, most clearly showing its characteristic aspects. Referring to FIG. 10, reference numeral 10 denotes a quartz tube and reference numeral 11 denotes a master laser for injection locking. There are also shown mirrors 12, an anode 13, a cathode 15 and a photodetector 19. In FIG. 10, reference numeral 100 denotes a laser beam propagating circuitally clockwise and reference numeral 101 denotes a laser beam, whereas reference numeral 200 denotes a laser beam propagating circuitally counterclockwise and reference numeral 201 denotes another laser beam.

Of the laser device having the above described configuration, the quartz tube 10 was formed by hollowing a quartz block by means of a drill. Thereafter, the mirrors 12 were fitted to the quartz tube 10. Additionally, the anode 13 and the cathode 15 were also fitted to the quartz tube 10. Subsequently, helium gas and neon gas were introduced into the quartz tube 10 and a voltage was applied between the anode and the cathode to give rise to an electric discharge and cause an electric current to flow. As a result, both the clockwise laser beam 100 and the counterclockwise laser beam 200 oscillated in the quarts tube 10.

When the quartz tube 10 is held stationary and no laser beam is led to enter the quartz tube from outside, the laser beam 100 and the laser beam 200 show a substantially identical oscillation frequency of $4.73 \times 10^{14}$ Hz and an identical wavelength $\lambda$ of 632.8 nm. The oscillation frequency $f_0$ of the laser beam 110 emitted from the laser for injection locking 11 is greater than the oscillation frequency $f_1$ of the laser beam 100 by 20 MHz. Under this condition, the laser beam 110 is emitted from the laser 11 is led to enter the quartz tube 10. The laser beam 110 and the laser beam 100 interact with each other in the region of the inside of the quartz tube 10 where the laser beam 110 and the laser beam 100 propagate in the same direction. As a result, the laser beam 100 is pulled into the laser beam 110 and the oscillation frequency of the laser beam 100 becomes equal to the oscillation frequency $f_0$ of the laser beam 110. As a result of the injection locking, the oscillation frequency of the laser beam 100 propagating through the quartz tube 10 clockwise becomes greater than that of the counterclockwise laser beam 200 by 20 MHz.

The laser beams propagating through the ring resonator type laser can be taken out from one of the mirrors 12 of the ring resonator type laser by reducing the reflectivity of that mirror. As the two laser beams 101, 201 emitted from the laser to the outside are received by the photodetector 19 at the same time, they interfere with each other in the photodetector 19. Then, a beat signal having an amplitude of 50 Mv and a frequency of 20 MHz can be obtained at the electric output terminal of the photodetector 19. The beat signal can be detected even when the quartz tube 10 is held stationary.

If the quartz tube 10 is driven to rotate clockwise at a rate of 180° per second and each side of the quartz tube 10 is 10 cm long, the oscillation frequency $f_2$ of the laser beam 200 propagating counterclockwise is raised by 248.3 Khz, while, on the other hand, the oscillation frequency $f_1$ of the laser beam 100 propagating clockwise is not changed because it is subjected to injection locking. Then, the beat frequency can be obtained by formula (14) below.

$$f_1-f_2=20 \text{ MHz}-248.3 \text{ kHz} \tag{14}$$

In the case where, on the other hand, the quartz tube 10 is driven to rotate counterclockwise at a rate of 180° per second, the beat frequency can be obtained by formula (15) below.

$$f_1-f_2=20 \text{ MHz}+248.3 \text{ kHz} \tag{15}$$

Since the absolute value of the increase or the decrease of the beat frequency is proportional to the rotation speed, it is now possible to detect not only the rotation speed of the semiconductor laser but also the sense or rotation because the increase or the decrease in the beat frequency shows a one-to-one correspondence with the sense or rotation.

While helium gas and neon gas were introduced into the quartz tube in this example, they may be replaced by any gas that can give rise to a laser oscillation. Additionally, the profile of the optical waveguide may be hexangular, triangular or circular instead of being rectangular.

Example 7

Figure 11:
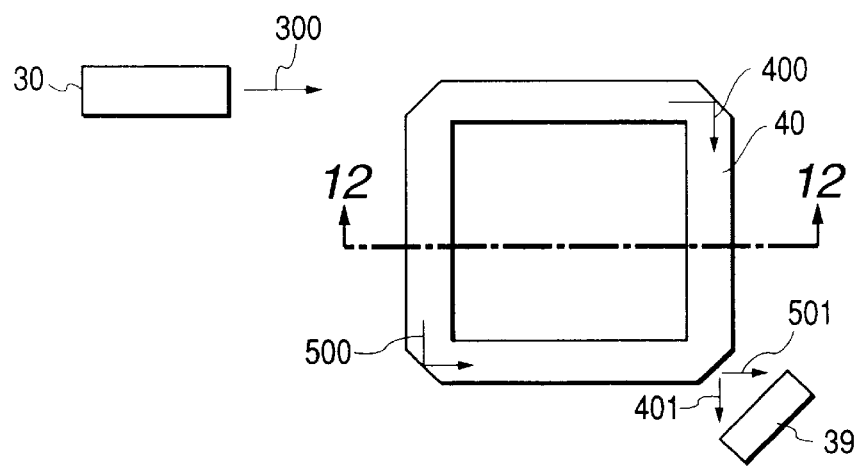
FIG. 11 is a schematic illustration of the gyro according to the invention and described hereinafter in Example 7.
Figure 12:
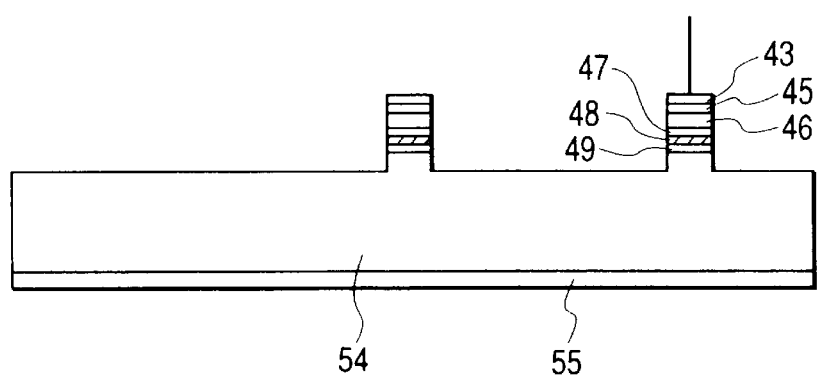
FIG. 12 is a schematic cross sectional view taken along line 12—12 in FIG. 11.

FIG. 11 is a schematic illustration of the seventh example of the invention, most clearly showing its characteristic aspects. FIG. 12 is a schematic cross sectional view of the laser device of FIG. 11 taken along line 12—12 in FIG. 11. In FIGS. 11 and 12, there are shown a semiconductor laser 30, a photodetector 39, a ring resonator type semiconductor laser 40, an anode 43, a cap layer 45, a cladding layer 46, an optical guiding layer 47, an active layer 48, another optical guiding layer 49, a semiconductor substrate 54 and a cathode 55. Reference numeral 300 denotes a third laser beam and reference numeral 400 denotes a laser beam propagating circuitally clockwise whereas reference numeral 500 denotes a laser beam propagating circuitally counterclockwise and reference numerals 401 and 501 denote laser beams.

Firstly, the method for preparing the gyro having the above described configuration will be described. An updoped InGaAsP optical guiding layer 49 having a 1.3 μm composition (0.15 μm thick), an undoped InGaAsP active layer 48 having a 1.55 μm composition (0.1 μm thick), another undoped InGaAsP optical guiding layer 47 having a 1.3 μm composition (0.15 μm thick), a p-InP cladding layer 46 (2 μm thick) and a p-InGaAsP cap layer 45 having a 1.4 μm composition (0.3 μm thick) were caused to grow on an n-InP substrate 54 (350 μm thick) by means of a metal organic vapor phase epitaxy technique for both the semiconductor laser for injection locking 30 and the ring resonator type semiconductor laser 40. While the semiconductor layers common to the semiconductor laser 30, the photodetector and the ring resonator type semiconductor laser 40 were caused to grow simultaneously in the example, they may alternatively be caused to grow separately. After the crystal growth process, photoresist AZ-1350 (tradename, available from Hoechst) was coated on the p-InGaAsP cap layer by means of a spin coater to obtain a film thickness of 1 μm. After prebaking the wafer at 80° C. for 30 minutes, it was exposed to light with a mask covering it. After the development and rinsing processes, the circuital optical waveguide of the ring resonator type semiconductor laser 40 had a width of 5 μm and a circuital length of 600 μm, whereas optical waveguide of the semiconductor laser 30 had a width of 5 μm and a circuital length of 300 μm.

Subsequently, the wafer was introduced into a reactive ion beam etching system and etched to have a hollow section with a depth of 3 μm by means of chlorine gas. Finally, Cr/Au was formed on the p-InGaAsP cap layer 45 by deposition in order to produce an anode 43 thereon, while AuGe/Ni/Au was formed on the n-InP substrate also by deposition in order to produce a cathode 55 thereon. Thereafter, the wafer was annealed in a hydrogen-containing atmosphere to have an ohmic contact.

Light incident upon the ring resonator type semiconductor laser having the above described configuration is reflected by the interface of the semiconductor and the air, because of the difference in the refractive index of the semiconductor and that of air. If the refractive index of the semiconductor is 3.5, a total reflection occurs when the angle between the normal to the interface and the laser beam is equal to or greater than 16.6/°. Since the mode of oscillation to cause the total reflection gives an oscillation threshold value smaller than any other modes because of a reduced mirror loss, the laser device begins oscillating with a low injected current level. Additionally, since optical gain concentrates to this oscillation mode, oscillations in any other modes will be suppressed. The angle between the normal to the interface of the semiconductor and air is 45° at any corner of the semiconductor laser and hence satisfies the angular requirement for total reflection in the above ring resonator type semiconductor laser 40. Note that, however, the interface from which the laser beams are taken out was made to have an angle of 16.5° between the normal to the interface and the laser beams in order to shift it from the conditions for total reflection.

The oscillation threshold current of the ring resonator type semiconductor laser 40 at room temperature is 2 Ma, while the oscillation threshold current of the semiconductor laser 30 is 10 Ma. In this example, a drive current of 20 Ma was used for the semiconductor laser 30, while a drive current of 3 Ma was used for the ring resonator type semiconductor laser 40.

When the laser device is held stationary and the semiconductor laser 30 for injection locking is not emitting any laser beam 300, the laser beam 400 and the laser beam 500 shows the same oscillation wavelength in the ring resonator type semiconductor lasers 40, which is equal to 1.55 μm.

On the other hand, the oscillation frequency $f_3$ of the laser beam 300 emitted from the semiconductor laser 30 is greater than the oscillation frequency $f_4$ of the laser beam 400 by 1 kHz. When the laser beam 300 is introduced into the ring resonator type semiconductor laser 40 under this condition, the two laser beam interact with each other in the region where the laser beam 300 and the laser beam 400 propagate in the same direction. As a result, the laser beam 400 is pulled to the laser beam 300 to give rise to an effect of phenomenon of injection locking that makes the oscillation frequencies of the two laser beams equal to each other. Thus, the oscillation frequency of the laser beam 400 propagating clockwise becomes greater than that of the laser beam 500 propagating counterclockwise by 1 kHz. Thus, as the two laser beams 401, 501 emitted from the ring resonator type laser 40 to the outside are received by the photodetector 39 at the same time, they interfere with each other in the photodetector 39 to generate an interfered beam having a beat frequency of 1 kHz in the inside of the photodetector 39 so that a beat voltage having an amplitude of 100 mV and this frequency can be detected. The beat voltage appears on the output terminal of the photodetector, even when the ring resonator type semiconductor laser 40 is held stationary.

If the ring resonator type semiconductor laser 40 is driven to turn clockwise at a rate of 30° per second which roughly corresponds to the rate of vibration of a camera being shaken by hand or that of a moving automobile, the oscillation frequency $f_5$ of the laser beam 500 propagating counter-clockwise is raised by 88.7 Hz, while, on the other hand, the oscillation frequency $f_4$ of the laser beam 400 propagating clockwise is not changed because of the injection locking. Then, the beat frequency can be obtained by formula (16) below.

$$f_4-f_5=1 \text{ kHz}-88.7 \text{ Hz} \tag{16}$$

In the case where, on the other hand, the ring resonator type semiconductor laser is driven to turn counterclockwise at a rate of 30° per second, the beat frequency can be obtained by formula (17) below.

$$f_3-f_4=1 \text{ kHz}+88.7 \text{ Hz} \tag{17}$$

Since the absolute value of the increase or the decrease in the beat frequency is proportional to the rotation speed, it is now possible to detect not only the rotation speed of the semiconductor laser but also the sense or rotation because the increase or the decrease in the beat frequency shows a one-to-one correspondence with the sense or rotation.

While an InGaAsP type semiconductor material is used in this example, a semiconductor material of any other type selected from the GaAs type, the ZnSe type, the InGaN type, the AlGaN type, and other types may alternatively be used for the purpose of the invention. Additionally, the profile of the optical path of the optical waveguide may be hexangular, triangular or circular in stead of being rectangular. Still additionally, the semiconductor laser 30 may have the Fabry-Perot type structure, the DFB structure or some other structure. Alternatively, it may be a variable wavelength laser. As for the control of the transverse mode, it may have a ridge type structure, a rib type structure, a buried type structure or some other structure.

Example 8

Figure 13:
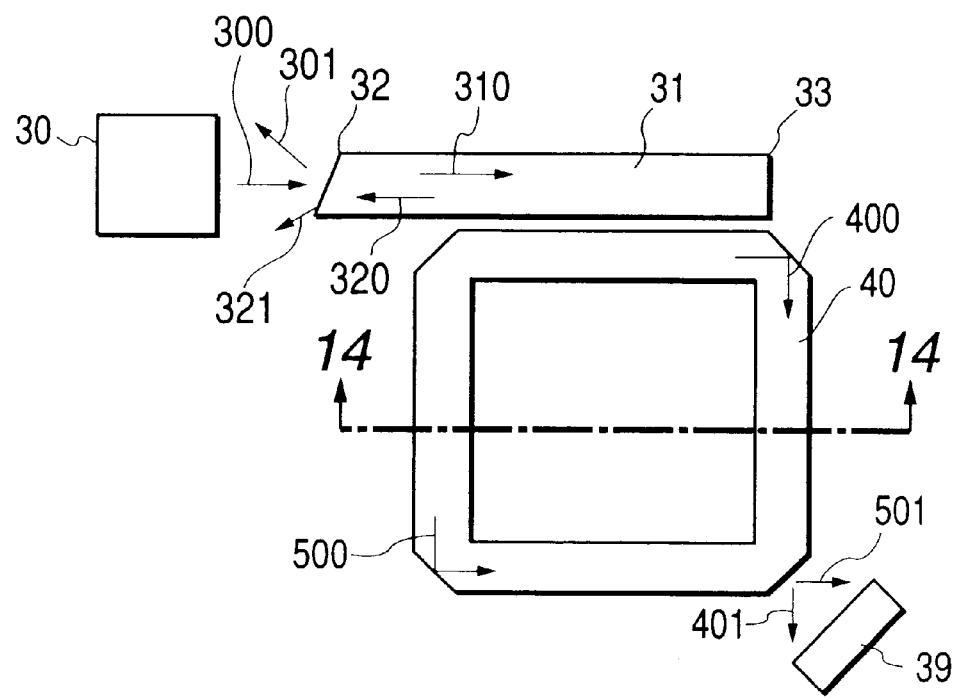
FIG. 13 is a schematic illustration of the gyro according to the invention and described hereinafter in Example 8.
Figure 14:
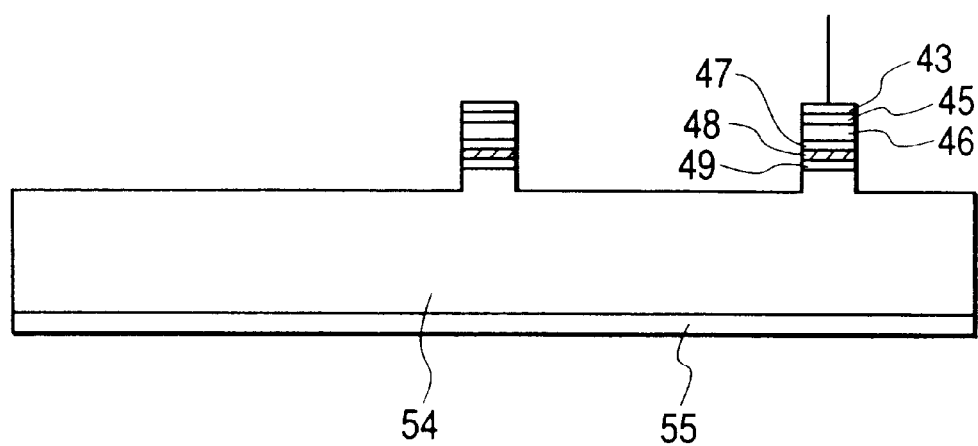
FIG. 14 is a schematic cross sectional view taken along line 14—14 in FIG. 13.

FIG. 13 is a schematic illustration of the eighth example of the invention, most clearly showing its characteristic aspects. In FIG. 13, reference numeral 31 denotes the optical waveguide for coupling the third laser beam 300 to the ring laser 40 and reference numerals 32 and 33 respectively denote the opposite end facets of the optical waveguide 31, whereas reference numerals 301, 310, 320 and 321 denote respective laser beams. Note that FIG. 14 is a schematic cross sectional view of the laser device of FIG. 13 taken along line 14—14 in FIG. 13.

The laser beam 300 emitted from the laser 30 is led to enter the optical waveguide 31. Then, the laser beam is optically coupled to the optical waveguide, and therefore, it is confined within and propagate through the optical waveguide 31 without being dispersed by diffraction. The end facet 32 of the optical waveguide 31 is inclined against a plane having a normal of the principal direction of propagation of the laser beam 300 by 7 degrees or more. Thus, the part of the laser beam 300 that is reflected by the end facet of the optical waveguide, or the laser beam 301 in FIG. 13, does not return to the semiconductor laser 30. Then, the laser beam 320 in FIG. 13 formed by the part of the laser beam 310 reflected by the other end facet 33 of the optical waveguide 31 and the part of the laser beam 500 of the ring laser coupled to the optical waveguide 31 also changes its direction of propagation and is emitted to the outside from the end facet 32 as a laser beam 321 in FIG. 13. This laser beam 321 does not return to the semiconductor laser 30 either. While the end facet 33 is perpendicular to the principal direction of propagation of laser beams in FIG. 13, it may also be inclined against a plane having a normal of the principal direction of propagation of laser beams.

As a laser beam propagates through the optical waveguide 31, a total reflection occurs at the interface of the optical waveguide. When the total reflection occurs, there exists evanescent light creeping along the interface. When the oscillation wavelength is 1.55 μm, the penetrating depth of the evanescent light is 0.075 μm. The intensity of the evanescent light attenuates exponentially (the penetrating depth being the distance at which the electric field amplitude attenuates to 1/e, where e is the base of natural logarithm). If the ring resonator type lasers 40 and the optical waveguide 31 are separated by 0.07 μm which is smaller than the penetrating depth, the laser beam 310 is coupled to the ring resonator type semiconductor laser 40 efficiently. As a result, the intensity of the laser beam 300 required for the laser beam 400 to be pulled to the laser beam 310 can be lower than that of the second example. The drive current of the semiconductor laser 30 was 18 mA.

As in the case of Example 2, a signal having an amplitude of 100 mV and a frequency of 1 kHz can be obtained from the terminal of the photodetector 39. In other words, a beat voltage can be detected even when the ring resonator type semiconductor laser 40 is held stationary.

The same signal as that of Example 2 can be obtained when the ring resonator type semiconductor laser 40 is driven to turn clockwise at a rate of 30° per second which roughly corresponds to the rate of vibration of a camera being shaken by hand or that of a moving automobile.

Example 9

Figure 15:
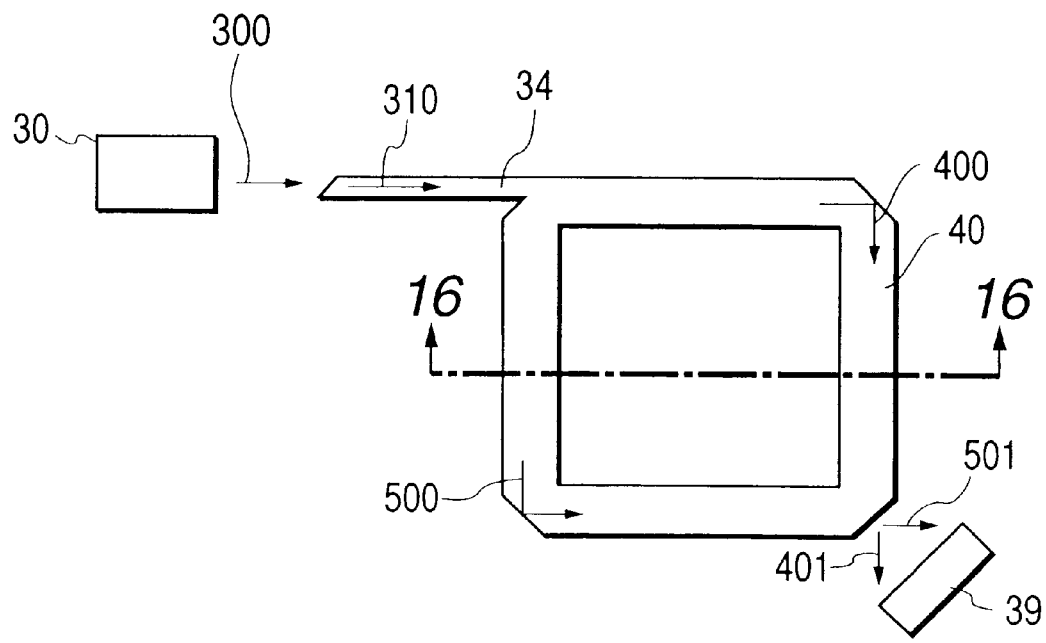
FIG. 15 is a schematic illustration of the gyro according to the invention and described hereinafter in Example 9.
Figure 16:
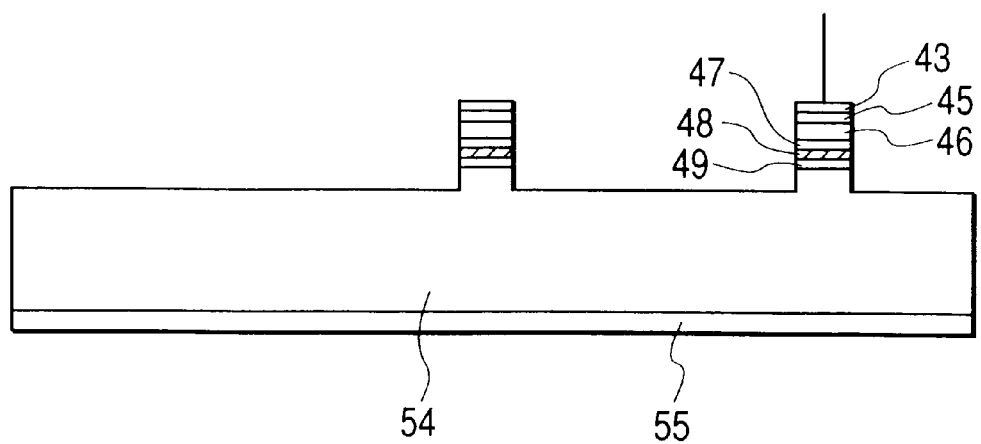
FIG. 16 is a schematic cross sectional view taken along line 16—16 in FIG. 15.

FIG. 15 is a schematic illustration of the ninth example of the invention, most clearly showing its characteristic aspects. In FIG. 15, reference numeral 34 denotes the optical waveguide connected to ring resonator type semiconductor laser 40. Note that FIG. 16 is a schematic cross sectional view of the laser device of FIG. 15 taken along line 16—16 in FIG. 15.

Since the optical waveguide 34 is connected to the ring resonator type semiconductor laser 40, the laser beam 310 is coupled to the ring resonator type semiconductor laser 40 more efficiently than that of Example 3. Consequently, the intensity of the laser beam 300 required for the laser beam 400 to be pulled to the laser beam 310 can be low. As a result, the drive current of the semiconductor laser 30 was 15 mA.

When a constant source current is used, a signal having an amplitude of 100 mV and a frequency of 1 kHz can be obtained as in the case of Example 2. In other words, a beat voltage can be detected even when the ring resonator type semiconductor laser 40 is held stationary.

The same signal as that of Example 2 can be obtained when the ring resonator type semiconductor laser 40 is driven to turn clockwise at a rate of 30° per second which roughly corresponds to the rate of vibration of a camera being shaken by hand or that of a moving automobile.

Example 10

Figure 17:
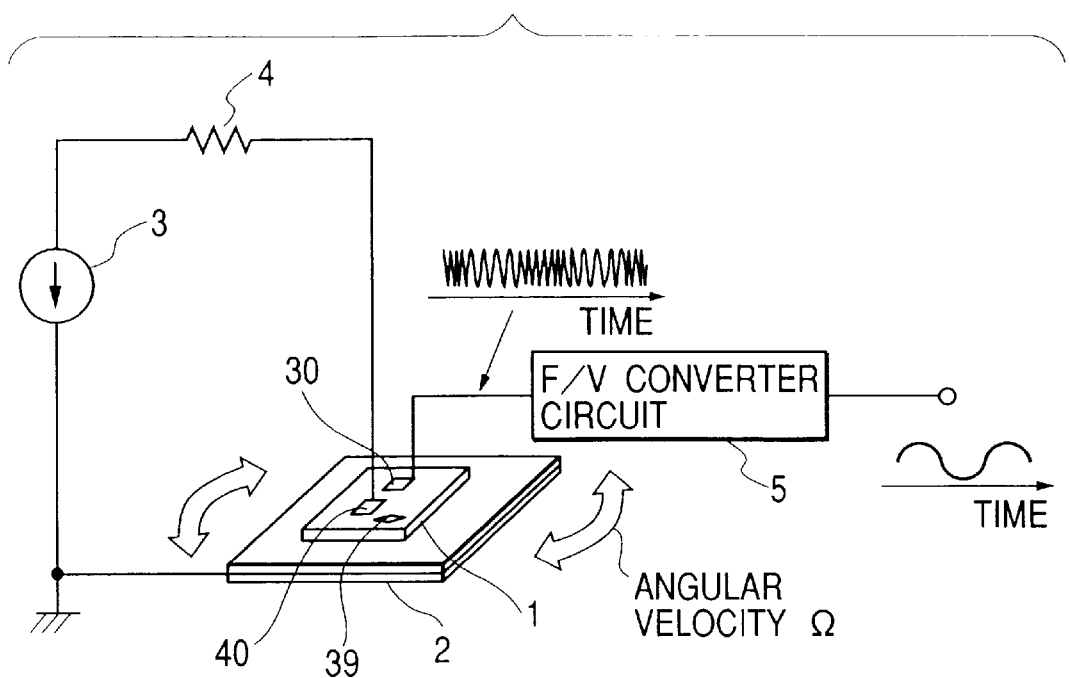
FIG. 17 is a schematic illustration of the gyro according to the invention and described hereinafter in Example 10.

FIG. 17 is a schematic illustration of the tenth example of the invention, most clearly showing its characteristic aspects. Referring to FIG. 17, there are shown an optical gyro 1, a rotary table 2, a current source 3, an electric resistor 4 and a frequency/voltage converter circuit (F/V converter circuit) 5.

With the above arrangement, an electric current is injected into the optical gyro 1 from the current source 3 by way of the resistor 4 that is connected in series. If the optical gyro 1 is held stationary, a beat signal representing the difference between the oscillation frequencies of the two laser beams in the optical gyro 1 can be obtained as a change in the terminal voltage. When the optical gyro 1 that is mounted on the rotary table 2 is driven to rotate, the obtained beat signal represents the angular velocity of the rotation of the gyro.

The beat frequency can be converted into a voltage value by causing the beat signal to pass through the frequency/voltage converter circuit (F/V converter circuit) 5. If the voltage output of the frequency/voltage converter circuit (F/V converter circuit) 5 is set to zero when the optical gyro 1 is held stationary by regulating the offset, the sense of rotation of the gyro can be detected by whether the output of the frequency/voltage converter circuit (F/V converter circuit) 5 is positive or negative.

As described above in detail, the sense of rotation of a gyro according to the invention can be detected by observing the beat frequency produced from the gyro when the gyro is rotated and determining the increase or decrease from the value obtained when the gyro is held stationary.

What is claimed is:

1. A gyro comprising:
   a laser device for generating a first and second laser beams to be propagated circuitally in opposite directions wherein an electric signal is taken out from said laser device,
   wherein a third laser beam having an oscillation frequency different from that of said first laser beam is led to enter said laser device so as to be propagated circuitally in the same direction as said first laser beam.

2. A gyro according to claim 1, wherein said third laser beam is led to enter the laser device from a corner mirror of a ring laser comprising said laser device.

3. A gyro according to claim 1, wherein said third laser beam is led to enter said laser device by way of an optical waveguide to be used for injection locking.

4. A gyro according to claim 3, wherein said optical waveguide for injection locking is arranged in the proximity of said laser device so as to be optically coupled to said laser device.

5. A gyro according to claim 3, wherein said optical waveguide for injection locking and said laser device are arranged within the penetrating depth of said third laser beam.

6. A gyro according to claim 3, wherein said optical waveguide for injection locking is connected to the waveguide of said ring laser comprising said laser device.

7. A gyro according to any one of claims 4 through 6, wherein at least one of the end facets of said optical waveguide for injection locking is inclined against a plane perpendicular to the direction of propagation of said third laser beam propagating through said optical waveguide for injection locking.

8. A gyro according to claim 1, wherein the difference between the oscillation frequency of said first laser beam and that of said third laser beam is not less than 100 Hz.

9. A gyro according to claim 1, the difference between the oscillation frequency of said first laser beam and that of said third laser beam is not less than 1 kHz.

10. A gyro according to claim 1, wherein the difference between the oscillation frequency of said first laser beam and that of said third laser beam is not less than 10 kHz.

11. A gyro according to claim 1, wherein said laser device is a ring resonator type laser device.

12. A gyro according to claim 1, wherein said laser device comprises a semiconductor laser.

13. A gyro according to claim 1 wherein said laser device comprises a gas laser.

14. A gyro according to claim 1, wherein said electric signal changes in response to the rotation of said laser device.

15. A gyro according to claim 1, wherein said electric signal is selected from the group consisting of a voltage signal and a current signal.

16. A gyro according to claim 1, wherein the angular velocity and the sense of rotation of an object are detected from the change in the frequency of said electric signal.

17. A gyro according to claim 1, wherein said laser device is provided with an electric terminal for taking out said electric signal.

18. A gyro according to claim 17, wherein a frequency/voltage converter circuit is connected to said electric terminal.

19. A gyro according to claim 1, wherein said electric signal is obtained by means of a photodetector arranged outside said laser device.

20. A gyro comprising:
    a laser device for generating a first and second laser beams propagating circuitally in opposite directions; and
    a photodetector for detecting an interfered beam caused by the interference of said first and second laser beams emitted from said laser device;
    wherein a third laser beam having an oscillation frequency different from that of said first laser beam is led to enter said laser device so as to be propagated circuitally in the same direction as said first laser beam.

21. A gyro according to claim 20, wherein said third laser beam is led to enter the laser device from a corner mirror of a ring laser comprising said laser device.

22. A gyro according to claim 20, wherein said third laser beam is led to enter said laser device by way of an optical waveguide to be used for injection locking.

23. A gyro according to claim 22, wherein said optical waveguide for injection locking is arranged in the proximity of said laser device so as to be optically coupled to said laser device.

24. A gyro according to claim 22, wherein said optical waveguide for injection locking and said laser device are arranged within the penetrating depth of said third laser beam.

25. A gyro according to claim 22, wherein said optical waveguide for injection locking is connected to the waveguide of said ring laser comprising said laser device.

26. A gyro according to any one of claims 22 through 25, wherein at least one of the end facets of said optical waveguide for injection locking is inclined against a plane perpendicular to the direction of propagation of said third laser beam propagating through said optical waveguide for injection locking.

* * * * *

UNITED STATES PATENT AND TRADEMARK OFFICE
CERTIFICATE OF CORRECTION

PATENT NO. : 6,351,311 B1
DATED : February 26, 2002
INVENTOR(S) : Takahiro Numai It is certified that error appears in the above-identified patent and that said Letters Patent is hereby corrected as shown below:

Column 1,
Line 26, "an" should read -- a --.

Column 4,
Line 53, "$f_2-f_1=f_{20}-f_{10}+(\Delta f_2+\Delta f_1)=f_{20}-f_{10}+(2S_2/\lambda_2 L_2)\cdot\Omega$" should read
-- $f_2-f_1=f_{20}-f_{10}-(\Delta f_2+\Delta f_1)=f_{20}-f_{10}-(2S_2/\lambda_2 L_2)\cdot\Omega$ --.

Column 10,
Line 18, "quarts" should read -- quartz --.

Column 13,
Line 25, "A s" should read -- As --.

Column 14,
Line 11, "in stead" should read -- instead --; and
Line 34, "gate: should read -- gates --.

Signed and Sealed this

Twenty-first Day of May, 2002

JAMES E. ROGAN
*Director of the United States Patent and Trademark Office*

*Attest:*

*Attesting Officer*